United States Patent [19]

Heath et al.

[11] Patent Number: 6,078,278

[45] Date of Patent: *Jun. 20, 2000

[54] SYSTEM INCLUDING A PRESENTATION APPARATUS, IN WHICH DIFFERENT ITEMS ARE SELECTABLE, AND A CONTROL DEVICE FOR CONTROLLING THE PRESENTATION APPARATUS, AND CONTROL DEVICE FOR SUCH A SYSTEM

[75] Inventors: Stephen R. Heath; Khodayar Feiz, both of Eindhoven, Netherlands; Chin Hong Leong, Shatin, The Hong Kong Special Administrative Region of the People's Republic of China; Karl Hanisch, Vienna, Austria; Christoph Dobrusskin, Eindhoven, Netherlands; Ruud Pollen, Oberwaltersdorf, Austria

[73] Assignee: U.S. Philips Corporation, New York, N.Y.

[ * ] Notice: This patent is subject to a terminal disclaimer.

[21] Appl. No.: 08/764,838

[22] Filed: Dec. 12, 1996

Related U.S. Application Data

[63] Continuation of application No. 08/623,645, Mar. 25, 1996, Pat. No. 5,757,739.

[30] Foreign Application Priority Data

Mar. 30, 1995 [AU] Australia .................................. A577/95
Feb. 28, 1996 [EP] European Pat. Off. .............. 96200527

[51] Int. Cl.[7] .................................................. G08C 19/12
[52] U.S. Cl. ......................... 341/176; 340/825.25; 369/36
[58] Field of Search .............................. 341/20, 173, 176; 340/825.24, 825.25; 369/30, 33, 36

[56] References Cited

U.S. PATENT DOCUMENTS 4,538,253 8/1985 Ishibashi et al. ......................... 369/36
5,757,739 5/1998 Heath et al. ............................. 369/36

FOREIGN PATENT DOCUMENTS

0262954B1 4/1988 European Pat. Off. .
91/07715 5/1991 European Pat. Off. .

Primary Examiner—Michael Horabik
Assistant Examiner—Timothy Edwards, Jr.
Attorney, Agent, or Firm—Michael E. Belk

[57] ABSTRACT

A system for holding a plurality of record carriers, which are each combined with an associated insert. The system includes an apparatus with a given number N of record-carrier holders to each of which a given code is assigned; and a control device having a unit for generating the code of a desired record-carrier holder to select that holder, and a unit for transmitting the generated code to the apparatus. The control device includes a set of flat insert carriers to which the same codes are assigned as to the record-carrier holder and which are each configured to hold at least one insert and to be movable relative to the adjacent insert carrier. The control device also includes an insert-carrier detection device configured to detect the code of an insert carrier relative to which the adjacent insert carrier has been moved and to transmit this code to the apparatus in order to select the desired record-carrier holder.

36 Claims, 12 Drawing Sheets

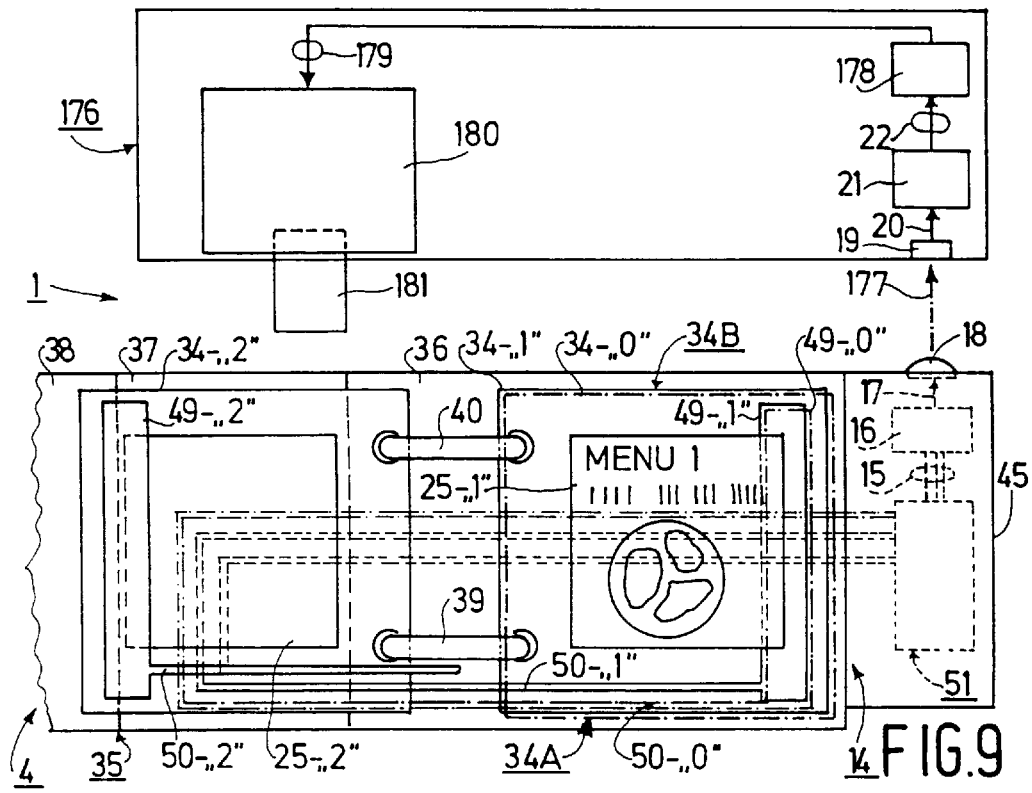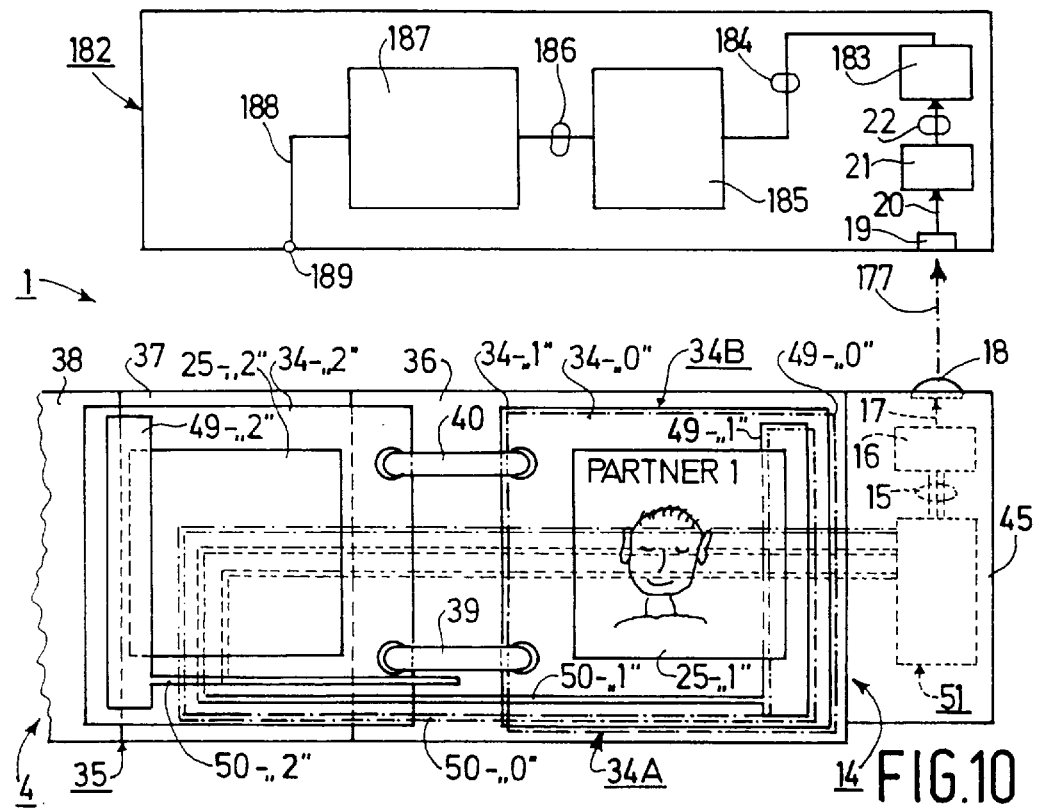

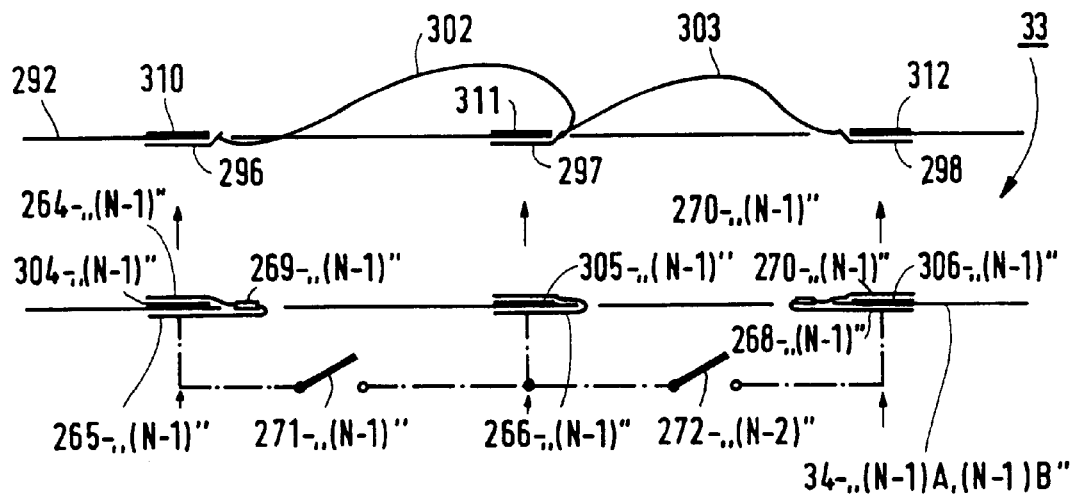
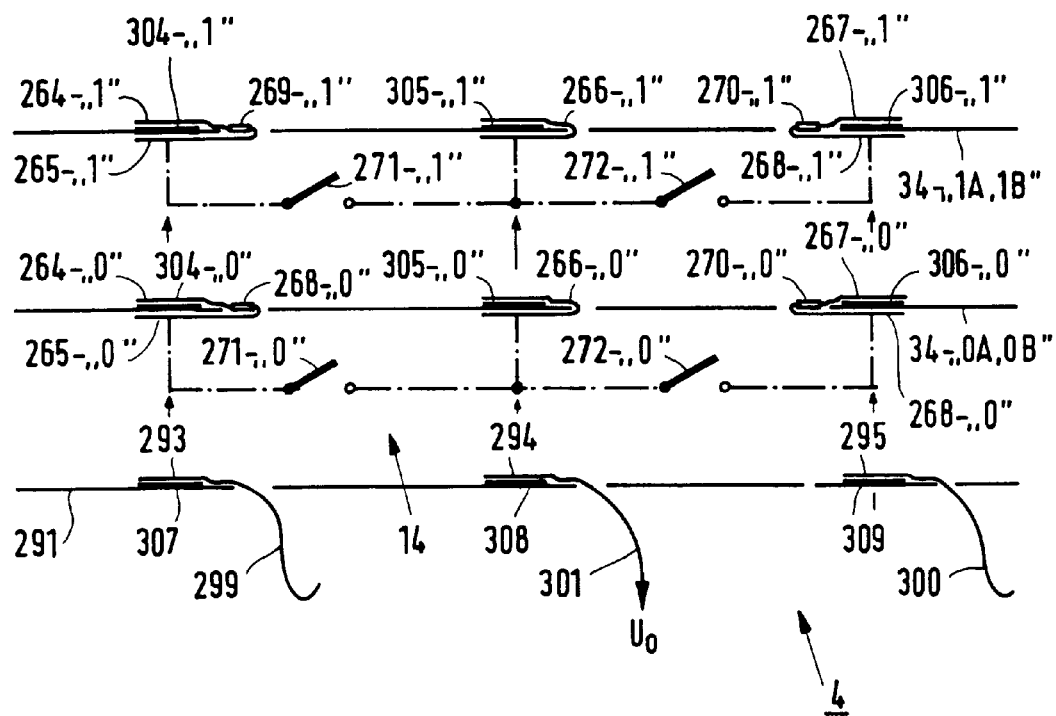
FIG. 16

SYSTEM INCLUDING A PRESENTATION APPARATUS, IN WHICH DIFFERENT ITEMS ARE SELECTABLE, AND A CONTROL DEVICE FOR CONTROLLING THE PRESENTATION APPARATUS, AND CONTROL DEVICE FOR SUCH A SYSTEM

This is a continuation of patent application Ser. No. 08/623,645 filed Mar. 28, 1996 now U.S. Pat. No. 5,757,739 issued May 26, 1998.

BACKGROUND OF THE INVENTION

The invention relates to a system comprising a presentation apparatus, in which a selectable item of a given number of different selectable items can be selected, and a control device for controlling the presentation apparatus, which control device includes selection means for selecting the selectable items.

The invention further relates to a control device for a system comprising a presentation apparatus, in which one selectable item of a given number of different selectable items can be selected, which control device includes selection means for selecting the selectable items.

A system of the type defined in the first paragraph and a control device of the type defined in the second paragraph are known, for example from the document EP-A 0 262 954. Said document describes a control device constructed as a remote control device, for controlling a presentation apparatus formed by an apparatus referred to as a CD-changer, reference being made to this apparatus in column 2, lines 48 to 57. The known control device of the known system has six keys by means of which one of six selectable items in the form of CD holders of the apparatus forming the presentation apparatus of the system and hence one of the CDs held therein can be selected, the same codes in the form of numerals being assigned to the six keys and to the six CD holders forming the selectable items. To select a desired CD in a CD holder forming a selectable item, in order reproduce the information stored in this CD, the user of the system has to know by which key of the control device he can select the CD holder in which the desired CD is situated. For this purpose, the user frequently draws up a usually hand-written catalog-like list which specifies for each key with a given number the index of the CD situated in the CD holder with the same number, which holder contains forms the item which can be selected by means of said key. To select a desired CD in a CD holder with a given number the user should first consult the list he has drawn up, in order to determine the associated key with the same number for the desired CD. The relevant CD holder forming the selectable item in the apparatus of the system is now selected by the subsequent actuation of the relevant key, in order to transfer the relevant CD to a playing device.

It has been found that making the above lists is regarded as inconvenient and user-unfriendly by the users of apparatuses for holding and, if desired, subsequently playing a plurality of CDs, and when at least one CD in an apparatus is replaced it is often omitted to update the list of CDs, which gives rise to erroneous operation because obviously a non-updated and therefore incorrect list will indicate a key which was associated with a CD previously held in an apparatus of the system, but upon whose actuation the CD situated in this given CD holder in the apparatus after the replacement will be selected and played.

SUMMARY OF THE INVENTION

It is an object of the invention to solve the above problems described hereinbefore for a known system including a presentation apparatus in the form of a CD changer and to improve and simply adapt a system of the type defined in the first paragraph and a control device of the type defined in the second paragraph in such a manner that a desired selectable item in a presentation apparatus can be selected simply, even when in such a presentation apparatus a multitude of items, for example about one hundred items, can be selected. Another object is to achieve that when selectable items in the presentation apparatus are exchanged this exchange is taken into account with a comparatively high probability. Moreover, this should be achieved without written listings about the relationships between keys with given codes and the selectable items associated with these keys.

According to the invention, in order to solve the above problems in a system of the type defined in the first paragraph, the control device comprises a set of insert carriers, in particular flat insert carriers, which set comprises a number of insert carriers proportional to the number of items selectable in the presentation apparatus, which insert carriers lie against one another in a rest position and are configured to hold at least one insert associated with a selectable item and provided with perceptible information relating to the relevant selectable item, which insert carriers are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the selectable item associated with the detected insert carrier is selectable.

By means of these steps in accordance with the invention it is achieved that for each selectable item in the presentation apparatus of a system in accordance with the invention an insert associated with this item can be linked to the flat insert-carrier associated with this selectable item so that, after the associated inserts have been linked to the appropriate insert carriers of the control device, in fact a catalog of inserts is obtained in the control device, which inserts contain for example information about the associated selectable items which is visually perceivable and/or perceivable by touching and which, for example, by looking through and/or by scanning of the tactile information provided on the inserts, makes it very easy to find the insert associated with an item the user wishes to select. After the desired insert has been found, the insert-carrier detection device makes it possible to detect the insert carrier to which the insert of the item to be selected by the user is linked, and by means of the insert-carrier detection device it is possible to select in the presentation apparatus of the system in accordance with the invention the item associated with the insert carrier thus detected, which can be effected in a manner known per se.

An advantageous embodiment of the system in accordance with the invention, adapted to hold a plurality of record carriers which are each combined with an associated insert provided with perceptible information relating to the contents stored on the associated record carrier, which system comprises as presentation apparatus an apparatus into which a given number of record carriers can be loaded and which for holding the record carriers comprises a number of record-carrier holders corresponding to the number of record carriers, and which further comprises a control device adapted to control the apparatus and comprising selection means for selecting each of the record-carrier holders forming the selectable items, is characterized in that the control device comprises a set of insert carriers, in particular flat insert carriers, which are proportional in number to the number of record-carrier holders provided in the apparatus and which lie against one another in a rest position, which insert carriers are each associated with at least one record-carrier holder, which are configured to hold each at least one insert associated with a record carrier, and which are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the record-carrier holder associated with the detected insert carrier is selectable. With this embodiment of a system in accordance with the invention it is achieved that when a record carrier is introduced into a given record-carrier holder forming the selectable item the associated insert combined with this record carrier can be linked to the flat insert carrier associated with this given record-carrier holder, so that after insertion of a multitude of record carriers into the appropriate record-carrier holders forming the selectable items and the corresponding linkage of the associated inserts with the appropriate insert carriers of the control device, in fact a catalog of inserts is obtained in the control device, by means of which, preferably by looking through, makes it very easy to find the insert associated with a record carrier which the user wishes to be played, replaced, re-recorded or the like. After the desired insert has been found, the insert-carrier detection device makes it possible to automatically determine the insert carrier to which the insert of the record carrier which the user wishes to be played, replaced, re-recorded or the like is linked, and by means of the insert-carrier detection device it is possible to select in the apparatus forming the presentation apparatus the record-carrier holder forming the selectable item and associated with the insert carrier thus detected, which can be effected in a manner known per se.

Another advantageous embodiment of a system in accordance with the invention is characterized in that the presentation apparatus of the system is a menu-ordering device for selecting and ordering one menu of a given number of different menus available in a restaurant or similar business and forming the selectable items, and the system further comprises a control device adapted to control the menu-ordering device and including selection means for selecting each of the menus forming the selectable items, and the control device comprises a set of (flat) insert carriers which are proportional in number to the number of menus which can be selected and ordered in the menu-ordering device and which lie against one another in a rest position, which insert carriers are each associated with at least one menu, which are configured to hold each at least one insert associated with a menu and provided with perceptible information relating to the associated menu, and which are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the menu associated with the detected insert carrier is selectable. With this embodiment of a system in accordance with the invention it is achieved that a catalog of inserts with perceptible information, such as for example visually perceptible images and/or descriptions of selectable menus or dishes, can be drawn up by means of which, for example by looking through the catalog or by scanning the inserts in the catalog, it is very easy to find the insert with perceptible information, associated with a menu desired by a restaurant guest and forming a selectable item, after which by means of the insert-carrier detection device the insert carrier can be determined to which the insert with perceptible information associated with the desired menu is linked, and after which finally, by means of the insert-carrier detection device, the menu associated with the insert carrier thus determined can be selected in the menu ordering device forming the presentation apparatus.

A further advantageous embodiment of a system in accordance with the invention is characterized in that the presentation apparatus of the system is a telephone-number output device for selecting and outputting one telephone number of a given number of different telephone numbers forming the selectable items and stored in said telephone-number output device, and the system further comprises a control device adapted to control the telephone-number output device and including selection means for selecting each of the telephone numbers forming the selectable items, and the control device comprises a set of (flat) insert carriers which are proportional in number to the number of selectable and outputtable telephone numbers in the telephone-number output device, and which lie against one another in a rest position, which insert carriers are each associated with at least one telephone number, which are configured to hold each at least one insert associated with a telephone number and provided with perceptible information relating to the associated telephone number, and which are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the telephone number associated with the detected insert carrier is selectable. In this embodiment of a system in accordance with the invention it is achieved that a catalog of inserts with perceptible information, such as for example visually perceptible names, addresses or photographs of telephone subscribers, of selectable telephone numbers can be drawn up, by means of which for example by looking through or by scanning the inserts in said catalog it is very easy to find the insert with perceptible information, associated with the telephone number desired by a subscriber and forming a selectable item, after which by means of the insert-carrier detection device the insert carrier can be determined to which the insert with perceptible information associated with the desired telephone number is linked, and after which finally, by means of the insert-carrier detection device, the telephone number associated with the insert carrier thus determined can be selected in the telephone-number output device forming the presentation apparatus.

In the above systems in accordance with the invention it has proved to be advantageous if a code is assigned to each insert carrier, which code corresponds to a code assigned to a selectable item. This is advantageous for a simple localization and detection of the insert carriers and a correct selection of the selectable items.

The code assigned to the insert carriers can be letters or symbols. However, it has proved to be particularly advantageous if the code assigned to each insert carrier is a numeral. This has the advantage that an orderly localization and detection of the insert carriers is possible.

In connection with insert carriers with codes a very advantageous embodiment of a system in accordance with the invention is characterized in that the insert-carrier detection device is adapted to detect the code of an insert carrier.

This results in a simple localization and detection of the insert carrier by detection of its code.

In this respect it has proved to be very advantageous if the control device comprises a storage device for storing the code detected by means of the insert-carrier detection device. This ensures that the code determined by means of the insert-carrier detection device cannot be lost and has the advantage that, if desired, this code is available to be transferred several times from the control device to the presentation apparatus.

In a system in accordance with the invention each insert carrier may be connected to a flat coil, the flat coils lying against one another when the insert carriers also lie against one another and being insulated from one another, an inductive coupling existing between coils of two adjacent insert carriers and the insert-carrier detection device being adapted to detect the presence of an inductive coupling between two flat coils and, on the basis of the relevant detection result, detecting that insert carrier of two adjacent insert carriers which have been moved relative to one another, whose associated insert is perceptible as a result of the movement of the two insert carriers relative to one another. However, it has proved to be very advantageous in a system in accordance with the invention, if each insert carrier has been provided with at least one electrically conductive foil, and when the insert carriers lie against one another the foils also lie against one another and are insulated from one another, the foils of insert carriers which lie against one another being capacitively coupled, and each foil can be connected to the insert-carrier detection device via an electrically conductive connection, and the insert-carrier detection device is adapted to detect the presence of a given capacitive coupling between two foils which lie against one another and on the basis of the respective detection result detects that insert carrier of two adjacent insert carriers which have been moved relative to one another, whose associated insert is perceptible as a result of the movement of the two insert carriers relative to one another. Such an embodiment has proved to be very advantageous for a maximal detection reliability and a simple construction.

In the above system in accordance with the invention it has proved to be very advantageous if the insert-carrier detection device is adapted to detect the absence of a capacitive coupling between the foils of two adjacent insert carriers which have been moved relative to one another. Such an embodiment has proved to be very favourable in practice because it provides a very high detection reliability in a very simple manner.

In a system with a control device comprising an insert-carrier detection device adapted to detect a given capacitive coupling it has proved to be very advantageous if the set of insert carriers comprises a first group of insert carriers and a second group of insert carriers, an insert carrier of one of the two groups of insert carriers being interposed between two insert carriers of the other one of the two groups of insert carriers, and the insert-carrier detection device comprises an alternating voltage generator having an output which can be connected time-sequentially to the foils of spatially succeeding insert carriers of one of the two groups of insert carriers, and an alternating voltage detector having an input which, in correspondence with the output of the alternating voltage generator, can be connected time-sequentially to the foils of spatially succeeding insert carriers of the other one of the two groups of insert carriers. This is favourable for a highly systematic detection process which proceeds in a logical sequence.

For the construction of the alternating voltage detector it has proved to be very advantageous if the alternating voltage detector comprises a correlator stage having a first input and a second input, and the first input can be connected time-sequentially to the foils of spatially succeeding insert carriers of the other one of the two groups of insert carriers, and the second input is connected to the output of the alternating voltage generator, which output can be connected time-sequentially to the foils of spatially succeeding insert carriers of one of the two groups of insert carriers. Such a construction can be realized very simply, for example by means of a single EXCLUSIVE-OR gate (briefly: XOR gate), and provides a high detection reliability despite its simplicity.

In a system in accordance with the invention it has also proved to be very advantageous if each insert carrier comprises at least one pair of two adjacent tracks of an electrically conductive material, and two adjacent tracks of a pair on that insert carrier of two adjacent insert carriers which have been moved relative to one another, whose associated insert is perceptible as a result of the movement of the two insert carriers relative to one another, can be interconnected by touching with at least one finger via the skin resistance of the at least one finger, and each track is connectable to the insert-carrier detection device via an electrically conductive connection, and the insert-carrier detection device is adapted to detect the presence of a resistance between two adjacent tracks of a pair on an insert carrier and on the basis of the respective detection result detects that insert carrier of two adjacent insert carriers which have been moved relative to one another, whose associated insert is perceptible as a result of the movement of the two insert carriers relative to one another. Such an embodiment has the advantage that its construction is simple. Another advantage is that for the detection of an insert carrier by means of the insert-carrier detection device a user should deliberately touch two tracks of a pair of juxtaposed tracks provided on such an insert carrier with at least one finger, and that by this deliberate touching of two tracks on an insert carrier it is additionally possible to initiate the selection of the selectable item associated with this insert carrier, which is advantageous for a simple operation.

In a system in accordance with the invention constructed as described in the preceding paragraph it has proved to be very advantageous if the insert-carrier detection device is adapted to detect the value of a resistance between two adjacent tracks of a pair on an insert carrier in a first detection operation and, in addition, in a subsequent second detection operation and to determine the difference between the resistance values detected in the two detection operations and, on the basis of the difference thus determined, detects that insert carrier of two adjacent insert carriers which have been moved relative to one another, whose associated insert is perceptible as a result of the movement of the two insert carriers relative to one another. This has the advantage that the detection of the value of a resistor is independent of the absolute value of this resistor.

In a system in accordance with the invention including a control device which comprises an insert-carrier detection device adapted to detect the presence of a resistance between two adjacent tracks of a pair on an insert carrier, it has further proved to be advantageous if the insert-carrier detection device for detecting the presence of a resistance between two adjacent tracks of a pair on an insert carrier comprises a circuit including a capacitor which is chargeable via a controllable switching device, two adjacent tracks of a pair on an insert carrier each being connectable to one of the two terminals of said capacitor via a controllable switching device each in order to discharge the capacitor, which terminals are connected to a voltage-level detector by means of which it is possible to detect that a given discharge voltage is reached, and there has been provided a microcomputer which cooperates with the controllable switching devices and the voltage-level detector to control the switching devices and to determine the time interval between the instant at which discharging of the capacitor begins and the instant at which the given discharge voltage across capacitor is reached, which microcomputer detects from the time interval thus determined the presence of a resistance between two adjacent tracks of a pair on an insert carrier and, on the basis of this detection result, detects that insert carrier of two adjacent insert carriers which have been moved relative to one another, whose associated insert is perceptible as a result of the movement of the two insert carriers relative to one another. Such an embodiment makes it possible to carry out a comparatively large number of detection cycles for the detection of the presence of a resistance in a comparatively short time interval.

In practice, it has also proved to be advantageous if the insert carriers of the set of insert carriers are arranged to overly one another as the pages of a book and are accommodated in a cover resembling that of a book. This is advantageous for a simple operation.

In a system in accordance with the invention the control device can be arranged directly on the presentation apparatus of the system, which may be favourable, for example, when the system is constructed as a jukebox, which is accessible to the public. However, it has proved to be very advantageous if the control device is a remote control device in which the set of preferably flat insert carriers is integrated. In this way, a system in accordance with the invention also has the advantages known from systems with customary remote control devices.

Moreover, it has proved to be very advantageous if each insert carrier of the set of insert carriers is flat and is formed by a sleeve of a transparent material, into which sleeve at least one insert can be introduced. This has the advantage of a particularly simple linkup between an insert and an insert carrier.

According to the invention a control device of the type defined in the second paragraph is characterized in that the control device comprises a set of insert carriers, in particular flat carriers, which set comprises a number of insert carriers proportional to the number of items selectable in a presentation apparatus, which insert carriers lie against one another in a rest position and are configured to hold at least one insert associated with a selectable item and provided with perceptible information relating to the relevant selectable item, which insert carriers are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the selectable item associated with the detected insert carrier is selectable.

In this way it is achieved that when a record carrier is introduced into a given record-carrier holder the associated insert combined with this record carrier can be linked to the flat insert carrier associated with this specific record-carrier holder, so that after a multitude of record carriers have been inserted into the appropriate record-carrier holders and the associated inserts have accordingly been linked to the appropriate insert carriers of the control device, in fact a catalog of inserts is obtained in the control device, which catalog can be looked through and thereby makes it very easy to find the insert associated with a record carrier which the user wishes to be played, replaced, re-recorded or the like. After the desired insert has been found the insert-carrier detection device automatically determines the insert carrier to which the insert of the record carrier which the user wishes to be played, replaced, re-recorded or the like is linked, and by means of the insert-carrier detection device it is possible to select in an apparatus the record-carrier holder associated with the insert carrier thus detected, which can be effected in a manner known per se.

Thus, it is achieved that for each selectable item in the presentation apparatus of a system in accordance with the invention an insert associated with this item can be linked to the flat insert-carrier associated with this selectable item so that, after the associated inserts have been linked to the appropriate insert carriers of the control device, in fact a catalog of inserts is obtained in the control device, which inserts contain for example information about the associated selectable items which is visually perceptible and/or perceptible by touching and which, for example, by looking through and/or by scanning of the tactile information provided on the inserts, makes it very easy to find the insert associated with an item the user wishes to select. After the desired insert has been found, the insert-carrier detection device makes it possible to detect the insert carrier to which the insert of the item to be selected by the user is linked, and by means of the insert-carrier detection device it is possible to select in the presentation apparatus of the system in accordance with the invention the item associated with the insert carrier thus detected, which can be effected in a manner known per se.

An advantageous embodiment of a control device in accordance with the invention for a system adapted to hold a plurality of record carriers which are each combined with an associated insert provided with perceptible information relating to the contents stored on the associated record carrier, which system comprises as presentation apparatus an apparatus into which a given number of record carriers can be loaded and which for holding the record carriers comprises a number of record-carrier holders corresponding to the number of record carriers, which a control device comprises selection means for selecting each of the record-carrier holders forming the selectable items, is characterized in that the control device comprises a set of flat insert carriers which are proportional in number to the number of record-carrier holders provided in the apparatus and which lie against one another in a rest position, which insert carriers are each associated with at least one record-carrier holder, which are configured to hold each at least one insert associated with a record carrier, and which are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the record-carrier holder associated with the detected insert carrier is selectable. Thus, it is achieved that when a record carrier is introduced into a given record-carrier holder forming the selectable item the associated insert combined with this record carrier can be linked to the flat insert carrier associated with this given record-carrier holder, so that after insertion of a multitude of record carriers into the appropriate record-carrier holders forming the selectable items and the corresponding linkup of the associated inserts with the appropriate insert carriers of the control device, in fact a catalog of inserts is obtained in the control device, by means of which, preferably by looking through, makes it very easy to find the insert associated with a record carrier which the user wishes to be played, replaced, re-recorded or the like. After the desired insert has been found, the insert-carrier detection device makes it possible to automatically determine the insert carrier to which the insert of the record carrier which the user wishes to be played, replaced, re-recorded or the like is linked, and by means of the insert-carrier detection device it is possible to select in the apparatus forming the presentation apparatus the record-carrier holder forming the selectable item and associated with the insert carrier thus detected, which can be effected in a manner known per se.

Another advantageous embodiment of a control device in accordance with the invention is characterized in that the control device has been provided for a system which comprises a menu-ordering device as presentation apparatus, in which one menu of a given number of different menus available in a restaurant or similar business and forming the selectable items can be selected and ordered, and the control device includes selection means for selecting each of the menus forming the selectable items, and the control device comprises a set of flat insert carriers which are proportional in number to the number of menus which can be selected and ordered in the menu-ordering device and which lie against one another in a rest position, which insert carriers are each associated with at least one menu, which are configured to hold each at least one insert associated with a menu and provided with perceptible information relating to the associated menu, and which are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the menu associated with the detected insert carrier is selectable. With this embodiment of a control device in accordance with the invention it is achieved that a catalog of inserts with perceptible information, such as for example visually perceptible images and/or descriptions of selectable menus or dishes, can be drawn up by means of which, for example by looking through the catalog or by scanning the inserts in the catalog, it is very easy to find the insert with perceptible information, associated with a menu desired by a restaurant guest and forming a selectable item, after which by means of the insert-carrier detection device the insert carrier can be determined to which the insert with perceptible information associated with the desired menu is linked, and after which finally, by means of the insert-carrier detection device, the menu associated with the insert carrier thus determined can be selected in the menu ordering device forming the presentation apparatus.

A further advantageous embodiment of a control device in accordance with the invention is characterized in that the control device has been provided for a system which comprises a telephone-number output device as presentation apparatus, in which one telephone number of a given number of different telephone numbers forming the selectable items and stored in said telephone-number output device are selectable and subsequently outputtable, and the control device includes selection means for selecting each of the telephone numbers forming the selectable items, and the control device comprises a set of flat insert carriers which are proportional in number to the number of selectable and outputtable telephone numbers in the telephone-number output device, and which lie against one another in a rest position, which insert carriers are each associated with at least one telephone number, which are configured to hold each at least one insert associated with a telephone number and provided with perceptible information relating to the associated telephone number, and which are each movable relative to the adjacent insert carrier, and the control device includes an insert-carrier detection device configured to detect that insert carrier of two adjacent insert carriers which have been moved relative to one another, whose associated insert is perceptible as a result of the movement of the two insert carriers relative to one another and by means of which the telephone number associated with the detected insert carrier is selectable. In this embodiment of a control device in accordance with the invention it is achieved that a catalog of inserts with perceptible information, such as for example visually perceptible names, addresses or photographs of telephone subscribers, of selectable telephone numbers can be drawn up, by means of which for example by looking through or by scanning the inserts in said catalog it is very easy to find the insert with perceptible information, associated with the telephone number desired by a subscriber and forming a selectable item, after which by means of the insert-carrier detection device the insert carrier can be determined to which the insert with perceptible information associated with the desired telephone number is linked, and after which finally, by means of the insert-carrier detection device, the telephone number associated with the insert carrier thus determined can be selected in the telephone-number output device forming the presentation apparatus.

In the above control devices in accordance with the invention it has proved to be advantageous if a code is assigned to each insert carrier, which code corresponds to a code assigned to a record-carrier holder of an apparatus. This is advantageous for a simple localization and detection of the insert carriers.

The code assigned to the insert carriers can be letters or symbols. However, it has proved to be particularly advantageous if the code assigned to each insert carrier is a numeral. This has the advantage that an orderly localization and detection of the insert carriers is possible.

In connection with insert carriers with codes a very advantageous embodiment is characterized in that the insert-carrier detection device is adapted to detect the code of an insert carrier relative to which the adjacent insert carrier has been moved. This results in a simple localization and detection of the insert carrier by detection of its code.

An advantageous embodiment of such a control device in accordance with the invention is characterized in that it comprises a storage device for storing the code detected by means of the insert-carrier detection device. This ensures that the code determined by means of the insert-carrier detection device cannot be lost and has the advantage that, if desired, this code is available to be transferred several times from the control device to the apparatus.

In a control device in accordance with the invention it has proved to be particularly advantageous if each insert carrier has been provided with at least one electrically conductive foil, and when the insert carriers lie against one another the foils also lie against one another and are insulated from one another, the foils of insert carriers which lie against one another being capacitively coupled, and each foil can be connected to the insert-carrier detection device via an electrically conductive connection, and the insert-carrier detection device is adapted to detect the presence of a given capacitive coupling between two foils which lie against one another and on the basis of the respective detection result detects that insert carrier of two adjacent insert carriers which have been moved relative to one another, whose associated insert is perceptible as a result of the movement of the two insert carriers relative to one another. This is advantageous for a maximal detection reliability and a simple construction of a control device.

In the case of a control device in accordance with the invention as mentioned above it has proved to be very advantageous if the insert-carrier detection device is adapted to detect the absence of a capacitive coupling between the foils of two adjacent insert carriers which have been moved relative to one another. Such an embodiment has proved to be very favourable in practice because it provides a very high detection reliability in a very simple manner.

In a control device comprising an insert-carrier detection device adapted to detect a capacitive coupling it has proved to be very advantageous the set of insert carriers comprises a first group of insert carriers and a second group of insert carriers, an insert, carrier of one of the two groups of insert carriers being interposed between two insert carriers of the other one of the two groups of insert carriers, and the insert-carrier detection device comprises an alternating voltage generator having an output which can be connected time-sequentially to the foils of spatially succeeding insert carriers of one of the two groups of insert carriers, and an alternating voltage detector having an input which, in correspondence with the output of the alternating voltage generator, can be connected time-sequentially to the foils of spatially succeeding insert carriers of the other one of the two groups of insert carriers. This is favourable for a highly systematic detection process which proceeds in a logical sequence.

For the construction of the alternating voltage detector of such a detection device it has proved to be particularly advantageous if the alternating voltage detector comprises a correlator stage having a first input and a second input, and the first input can be connected time-sequentially to the foils of spatially succeeding insert carriers of the other one of the two groups of insert carriers, and the second input is connected to the output of the alternating voltage generator, which output can be connected time-sequentially to the foils of spatially succeeding insert carriers of one of the two groups of insert carriers. This is advantageous in order to obtain an alternating voltage detector which combines a simple construction with high detection reliability.

In a control device in accordance with the invention it has proved to be very advantageous if each insert carrier comprises at least one pair of two adjacent tracks of an electrically conductive material, and two adjacent tracks of a pair on that insert carrier of two adjacent insert carriers which have been moved relative to one another, whose associated insert is perceptible as a result of the movement of the two insert carriers relative to one another, can be interconnected by touching with at least one finger via the skin resistance of the at least one finger, and each track is connectable to the insert-carrier detection device via an electrically conductive connection, and the insert-carrier detection device is adapted to detect the presence of a resistance between two adjacent tracks of a pair on an insert carrier and on the basis of the respective detection result detects that insert carrier of two adjacent insert carriers which have been moved relative to one another, whose associated insert is perceptible as a result of the movement of the two insert carriers relative to one another. Such an embodiment has the advantage that its construction is simple. Another advantage is that for the detection of an insert carrier by means of the insert-carrier detection device a user should deliberately touch two tracks of a pair of juxtaposed tracks provided on such an insert carrier with at least one finger, and that by this deliberate touching of two tracks on an insert carrier it is additionally possible to initiate the selection of the selectable item associated with this insert carrier, which is advantageous for a simple operation.

In a control device in accordance with the invention constructed as described in the preceding paragraph it has proved to be very advantageous if the insert-carrier detection device is adapted to detect the value of a resistance between two adjacent tracks of a pair on an insert carrier in a first detection operation and, in addition, in a subsequent second detection operation, and to determine the difference between the resistance values detected in the two detection operations and, on the basis of the difference thus determined, detects that insert carrier of two adjacent insert carriers which have been moved relative to one another, whose associated insert is perceptible as a result of the movement of the two insert carriers relative to one another. This has the advantage that the detection of the value of a resistor is independent of the absolute value of this resistor.

In a control device in accordance with the invention which comprises an insert-carrier detection device adapted to detect the presence of a resistance between two adjacent tracks of a pair on an insert carrier, it has further proved to be advantageous if the insert-carrier detection device for detecting the presence of a resistance between two adjacent tracks of a pair on an insert carrier comprises a circuit including a capacitor which is chargeable via a controllable switching device, two adjacent tracks of a pair on an insert carrier each being connectable to one of the two terminals of said capacitor via a controllable switching device each in order to discharge the capacitor, which terminals are connected to a voltage-level detector by means of which it is possible to detect that a given discharge voltage is reached, and there has been provided a microcomputer which cooperates with the controllable switching devices and the voltage-level detector to control the switching devices and to determine the time interval between the instant at which discharging of the capacitor begins and the instant at which the given discharge voltage across capacitor is reached, which microcomputer detects from the time interval thus determined the presence of a resistance between two adjacent tracks of a pair on an insert carrier and, on the basis of this detection result, detects that insert carrier of two adjacent insert carriers which have been moved relative to one another, whose associated insert is perceptible as a result of the movement of the two insert carriers relative to one another. Such an embodiment makes it possible to carry out a comparatively large number of detection cycles for the detection of the presence of a resistance in a comparatively short time interval.

In a control device in accordance with the invention it has also proved to be advantageous if the flat insert carriers of the set of insert carriers are arranged to overly one another as the pages of a book and are accommodated in a cover resembling that of a book. This is advantageous for a simple use of the control device.

Moreover, it has proved to be advantageous for a control device in accordance with the invention if it is constructed as a remote control device in which the set of flat insert carriers is integrated. In this way, a control device in accordance with the invention also has the advantages known from customary remote control devices.

It has further proved to be very advantageous if each flat insert carrier of the set of insert carriers is formed by a sleeve of a transparent material, into which sleeve at least one insert can be introduced. This is advantageous in order to obtain an as simple as possible coupling between an insert and an insert carrier.

The above-mentioned aspects as well as further aspects of the invention will be apparent from and will be elucidated by means of the embodiments described by way of examples hereinafter.

BRIEF DESCRIPTION OF THE DRAWINGS

The invention will now be described in more detail with reference to some exemplary embodiments which are shown in the drawings but to which the invention is not limited in which:

FIG. 9 shows a system in accordance with a third embodiment of the invention, which comprises as presentation apparatus a menu-ordering device and a remote control device in accordance with the invention for controlling the menu-ordering device, the remote control device basically corresponding to the remote control device of the system shown in FIGS. 1 to 6.

FIG. 10 shows a system in accordance with a fourth embodiment of the invention, which comprises as presentation apparatus a telephone-number output device and a remote control device in accordance with the invention for controlling the telephone-number output device, the remote control device basically corresponding to the remote control device of the system shown in FIGS. 1 to 6.

FIG. 16 schematically shows a part of a remote control device of a further system in accordance with the invention.

DESCRIPTION OF THE PREFERRED EMBODIMENTS

Figure 1:
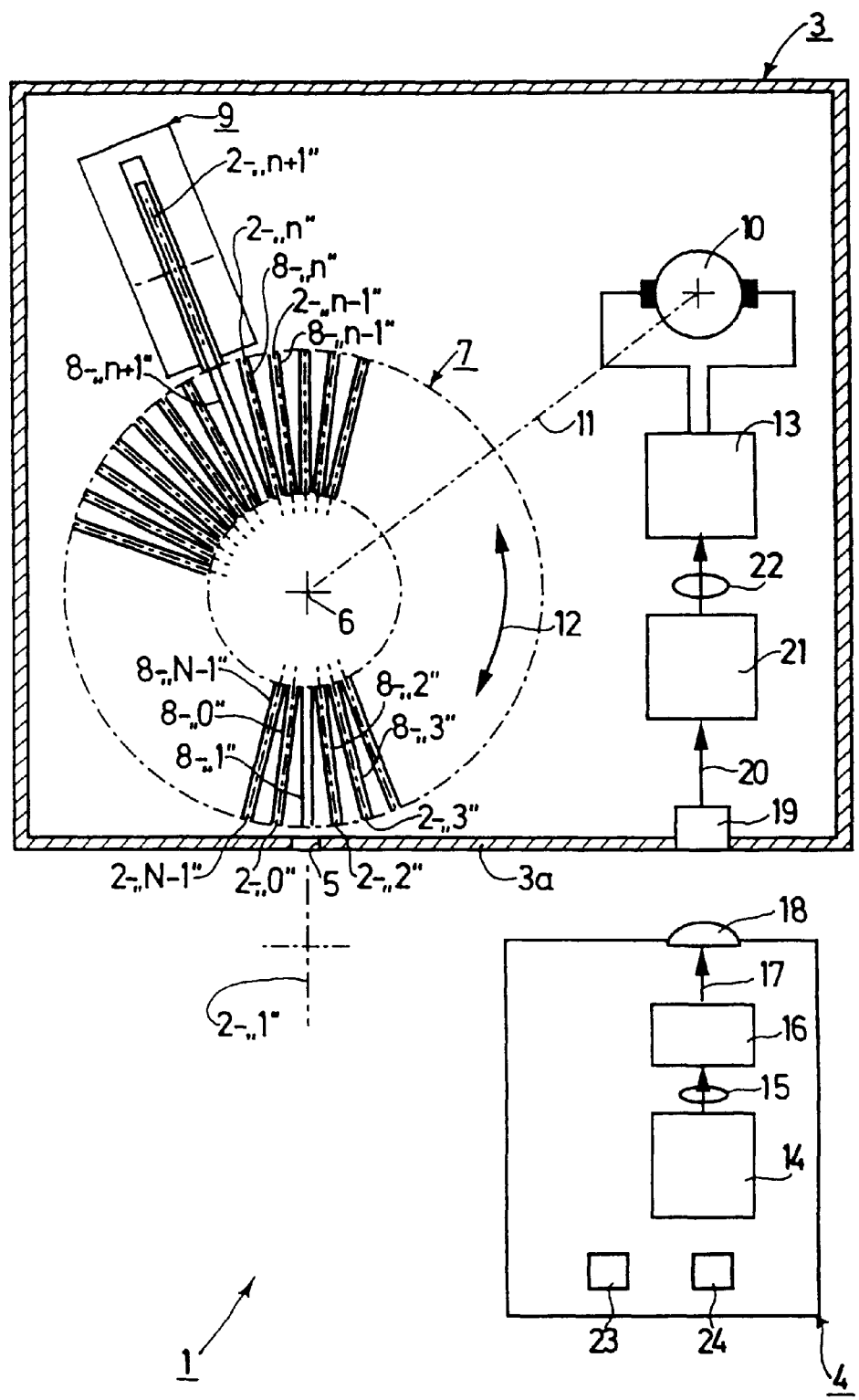
FIG. 1 shows a first embodiment of a system in accordance with the invention configured to play a multitude of disc-shaped record carriers, comprising a presentation apparatus constructed as a changer and a first embodiment of a remote control device in accordance with the invention for controlling the apparatus.

FIG. 1 shows diagrammatically a system 1 intended for playing commercially available record carriers 2, shown symbolically in dash-dot lines in FIG. 1. In the present case the record carriers 2 are optically scanned disc-shaped record carriers generally referred to as "Compact Discs" or briefly "CD". Each of these record carriers 2 is available with an associated insert, which will be described in more detail hereinafter. Each of these inserts, which take the form of either a leaflet or a booklet, contains visible information relating to the contents of the associated record carrier 2, which information has, for example, been printed on the relevant insert.

The system 1 comprises an apparatus 3, which is to be regarded as the presentation apparatus, and a control device 4, in the present case formed by a remote control device, for controlling the presentation apparatus, i.e. the apparatus 3. The apparatus 3 can accept a given number N of record carriers 2. To load a record carrier 2 into the apparatus 3 a front wall 3a of the apparatus 3 has a slot 5 through which a record carrier 2 can be introduced into the apparatus 3.

To hold the record carriers 2 the apparatus 3 comprises a carrousel-type holding device 7, which is rotatable about an axis 6. The holding device 7 has a number N of record-carrier holders 8 which correspond to the number N of record carriers 2 to be held and which in the present case should be regarded as the selectable items. A given code is assigned to each of these record-carrier holders 8. In the present case, the codes assigned to the record-carrier holders 8 are numerals, i.e. the numerals "0", "1", "2", "3" to "n" and, finally, to "N−1".

The apparatus 3 further comprises a playing device 9. By means, not shown, a record carrier 2 can be removed from its record-carrier holder 8 in the holding device 7 and can be introduced into the playing device 9. Each record carrier 2 thus introduced can be played in the playing device 9. The record carrier 2 can be returned from the playing device 9 into the appropriate record-carrier holder 8 of the holding device 7 by means, not shown.

In order to enable a record carrier 2 present in the carrousel-type holding device 7 to be loaded into the playing device 9 or to be removed from the playing device 9 the record-carrier holder 8 for the relevant record carrier 2 should be selected and brought into a given position relative to the playing device 9, as is shown in FIG. 1 for the record-carrier holder 8-"n+1" bearing the numeral "n+1".

To load a record carrier 2 into a given record-carrier holder 8 from the outside or to remove an inserted record carrier 2 from the record-carrier holder 8 with the aid of further means, not shown, in order to remove it from the apparatus 3, the record-carrier holder 8 associated with the relevant record carrier 2 should be moved into a given position relative to the slot 5 in the front wall 3a of the apparatus 3, as is shown for the record-carrier holder 8-"1" bearing the numeral "1" in FIG. 1.

To drive the carrousel-type holding device 7 of the apparatus 3 the apparatus 3 has a motor 10 by means of which the holding device 7 can be rotated in opposite directions, as indicated by a double arrow 12, via a drive connection 11 represented as a dash-dot line. The drive motor 10 is powered by a control and supply device 13, which controls and powers the drive motor 10 in dependence upon control information associated with a given record-carrier holder 8 and corresponding to a number assigned to a given record-carrier holder 8, in such a manner that the relevant record-carrier holder 8 is rotated into its relative position corresponding to the slot 5 or into its relative position corresponding to the playing device 9.

To control the apparatus 3, inter alia to select a given desired record-carrier holder 8 forming the selectable item, the system 1 comprises a control device constructed as the remote control device 4. The remote control device 4 comprises selection means 14 for generating the code, i.e. the number, of a desired record-carrier holder 8 and for selecting such a desired record-carrier holder 8. A, for example multi-wire, connection 15 connects the means 14 for generating the number of a desired record-carrier holder 8 and for selecting this holder to means 16 for converting the generated number into a form suitable for simple transmission to the apparatus 3. In the present case the means 16 for converting the generated number into a form suitable for simple transmission to the apparatus 3 are connected to an infrared transmitter 18 via a further electrical connection 17.

Signals supplied by the infrared transmitter 18 are received by an infrared receiver 19 of the apparatus 3 and, via an electrical connection 20, they are applied to means 21 for processing the received signals and reconverting them into a form representing the generated number. The means 21 supply said control information corresponding to the received number to the control and supply device 13 via a, for example multi-wire, electrical connection 22.

FIG. 1 also shows a first key 23 and a second key 24 of the remote control device 4. The first key 23 serves to start the transmission of a number generated by the selection means 14 to the apparatus 3, a number transmitted to the apparatus 3 upon actuation of the key 23 being processed in the control and supply device 13 of the apparatus 3 in such a manner that the motor 10 rotates the carrousel-type holding device 7 so as to bring the record-carrier holder 8 associated with the transmitted number into its relative position corresponding to the slot 5 in the front wall 3a of the apparatus 3, for example to remove the record carrier 2 present in the relevant record-carrier holder 8 from the apparatus 3 or to load a record carrier 2 into this record-carrier holder 8. The second key 24 serves to start the transmission of a number generated by the means 14 to the apparatus 3, whose control and supply device 13 processes a number transmitted upon actuation of the second key 24 in such a manner that the motor 10 rotates the carrousel-type holding device 7 so as to bring the record-carrier holder 8 associated with the transmitted number into its relative position corresponding to the playing device 9.

As is apparent from the above description, the apparatus 3 is a presentation apparatus in which it is possible to select from a given number of different selectable items, in the present apparatus 3 formed by the record-carrier holders 8, one selectable item, i.e. one record-carrier holder 8, by means of the control device formed by the remote-control device 4, which comprises selections means, to be described hereinafter, for selecting the selectable items, i.e. the record-carrier holders.

Figure 2:
FIG. 2 shows a cassette-like container in its closed condition, which container accommodates a disc-shaped record carrier and an associated insert with visible information relating to the contents of the record carrier.
Figure 3:
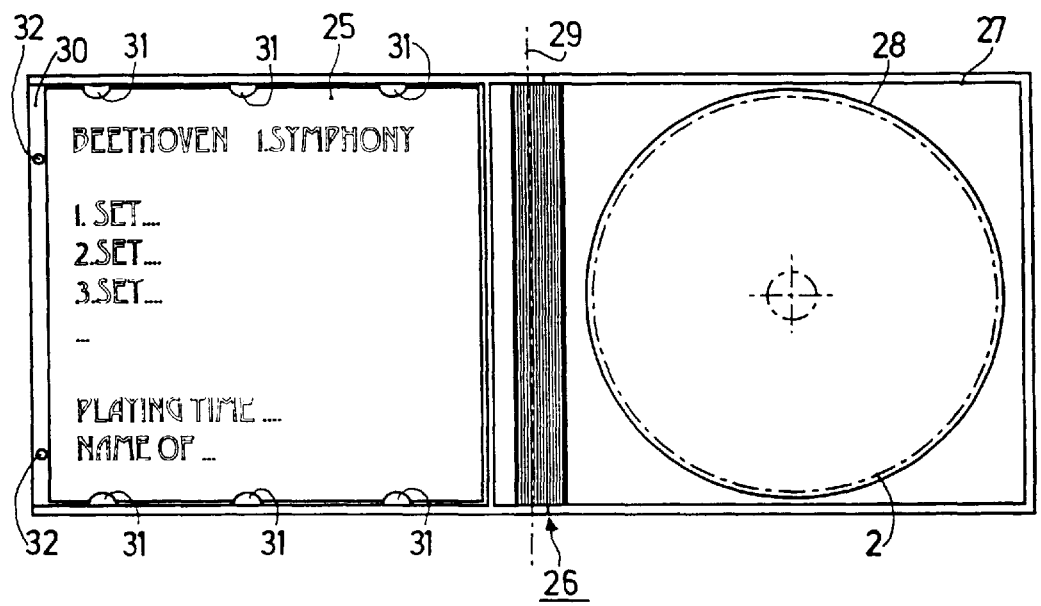
FIG. 3 shows the cassette-like container of FIG. 2 in an open condition.

Referring to FIGS. 2 and 3, it is to be noted once again that each disc-shaped record carrier 2 is commercially available together with an associated insert 25. When purchased each record carrier 2, which is again shown in dash-dot lines in FIG. 3, and each associated insert 25 are accommodated in a cassette-like container 26. Each container comprises a bottom section 27, having a recessed portion 28 for holding a record carrier 2, and a cover section 30 of a transparent material, which is pivotable relative to the bottom section 27 about a pivotal axis 29 and in which the relevant insert 25 is present, the insert 25 being held in place by means of hold-down tabs 31 and raised portions 32. Each insert 25 contains visible information relating to the contents stored on the associated record carrier 2. For example, the information printed on each insert 25 includes the composer of a piece of music, the title of a piece of music, the interpreter of a piece of music, the name of an orchestra playing a piece of music, the director of this orchestra and a variety of further information. Very frequently such an insert 25 also contains pictures, photographs or graphics relating the contents of the associated record carrier 2. An important advantage of these inserts 25 is that the user is almost immediately informed of the contents of the associated record carrier 2 by means of the visible information provided on such an insert 25.

Figure 4:
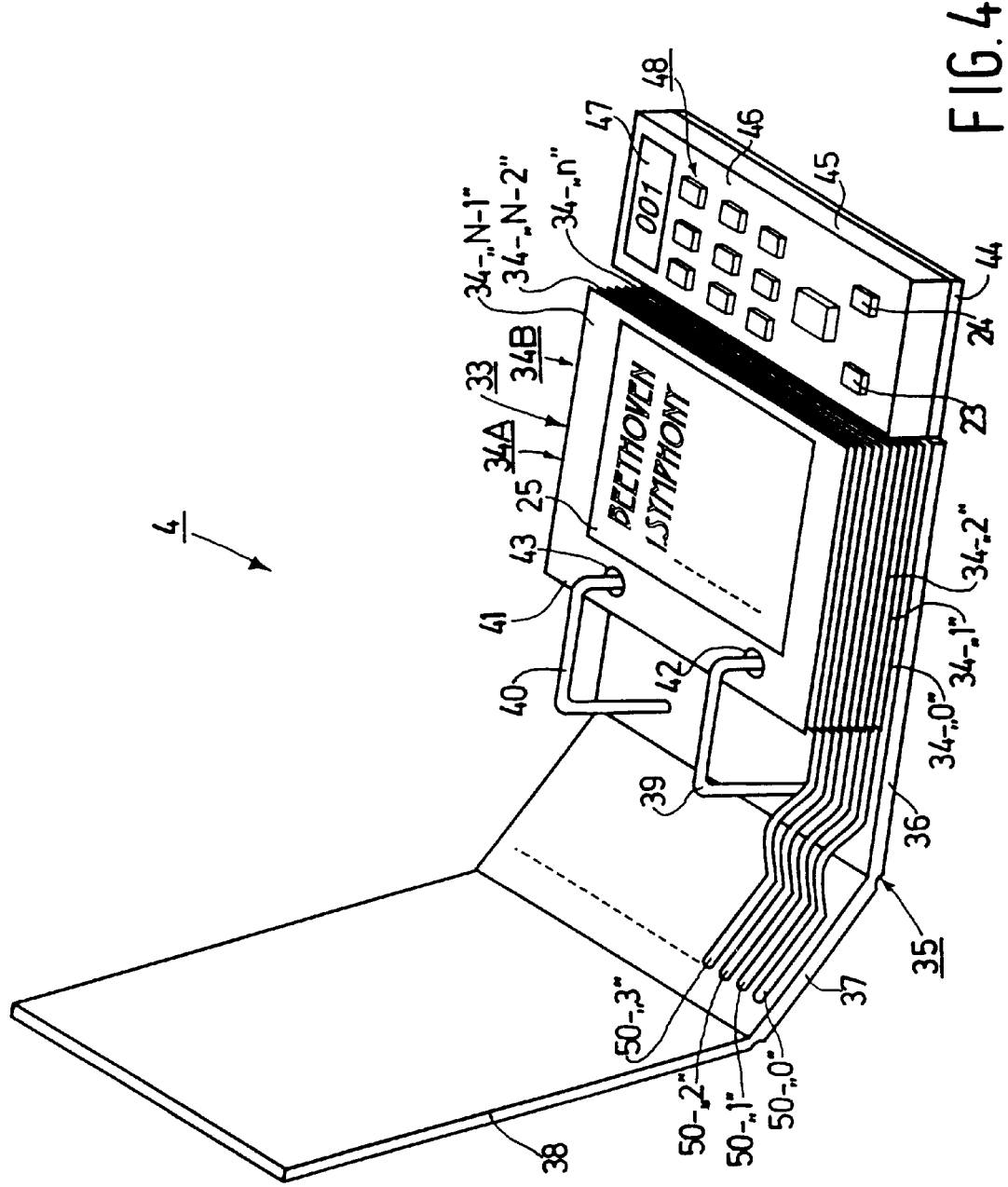
FIG. 4 is an oblique view showing the remote control device of the system shown in FIG. 1.

FIG. 4 shows the remote control device 4 of the system 1 of FIG. 1 in more detail. The remote control device 4 comprises a set 33 of flat insert carriers 34. In the present case the set 33 of flat insert carriers 34 comprises a number N of carriers 34 proportional to the number N of record-carrier holders 8 provided in the apparatus 3, each one of the insert carriers 34 being associated with a respective one of the record-carrier holders 8. In the present case the number N of insert carriers 34 corresponds to the number N of record carriers 8. However, this is not necessarily so. For example, in the case of a number of N record-carrier holders 8 a number of only N/2 or N/3 or N/4 insert carriers 34 may be provided. In this respect it is to be noted that the set 33 of insert carriers 34 comprises a first group 34A of insert carriers 34 and a second group 34B of insert carriers 34. The first group 34A of insert carriers 34 now includes the insert carriers 34-"0", 34-"2", 34-"4" etc. The second group 34B of insert carriers 34 in this case includes the insert carriers 34-"1", 34-"3", 34-"5" etc.

In a rest position shown in FIG. 4 the insert carriers 34 lie against one another with their flat surfaces in the same way as the pages of a book. For a well-ordered arrangement of the insert carriers 34 the remote control device 4 comprises a cover 35 resembling that of a book, which cover comprises a lower part 36, a back part 37 and an upper part 38. Two U-shaped brackets 39 and 40 are connected to the lower part 36.

In the present case each of the flat insert carriers 34 is formed by a sleeve of a transparent and electrically insulating material. An insert 25 can be introduced into each sleeve and remains visible because the sleeve is transparent. Each insert carrier 34 in the form of a sleeve has two holes 42 and 43 in its left-hand margin area 41, through which holes the U-shaped brackets 39 and 40 extend.

A lateral extension 44 is integrally connected to the lower part 36 of the cover 35. The lateral extension 44 carries a housing 45 which accommodates the electrical circuitry of the remote control device 4 and in whose upper surface 46 a display device 47, formed by what is referred to as a 7-segment display, and a set 48 of keys are arranged. The set 48 of keys includes the two keys 23 and 24.

The flat insert carriers 34 have the same codes, i.e. in the present case the numerals "0", "1", "2", "3" to "n" and, finally, to "N−1", as the record-carrier holders 8 of the apparatus 3. However, this is not necessarily so because it is also possible to assign two, three or four numbers of a record-carrier holder 8 to an insert carrier 34. In the present case each insert carrier 34 is adapted to receive an insert 25 associated with a record carrier 2. However, again this is not necessarily so because an insert carrier 34 may also be adapted to hold two, three or four inserts 25. Moreover, the insert carriers 34 and the record-carrier holders 8 need not bear the same codes; for example, the codes assigned to the insert carriers 34 may be letters or combinations of letters and numerals and those assigned to the record-carrier holders 8 may be binary data words, in which case merely the relationship between the letters or letter/numeral combinations and the binary data words should be defined in order to enable the associated record-carrier holder 8 to be selected by means of an insert carrier 34.

Each insert carrier 34 is movable relative to the adjacent insert carrier 34. In the present case for example the uppermost insert carrier bearing the number "N−1", i.e. 34-"N−1" in FIG. 4, is movable in that the uppermost insert carrier 34-"N−1" is lifted off the insert carrier 34-"N−2" underneath it, the uppermost insert carrier 34-"N−1" being moved towards the back part 37 and the upper part 38 over the U-shaped brackets 39 and 40. This is the same as turning a page in a book. All the other insert carriers 34 can be moved relative to the insert carriers 34 underneath them in an entirely similar way.

Figure 5:
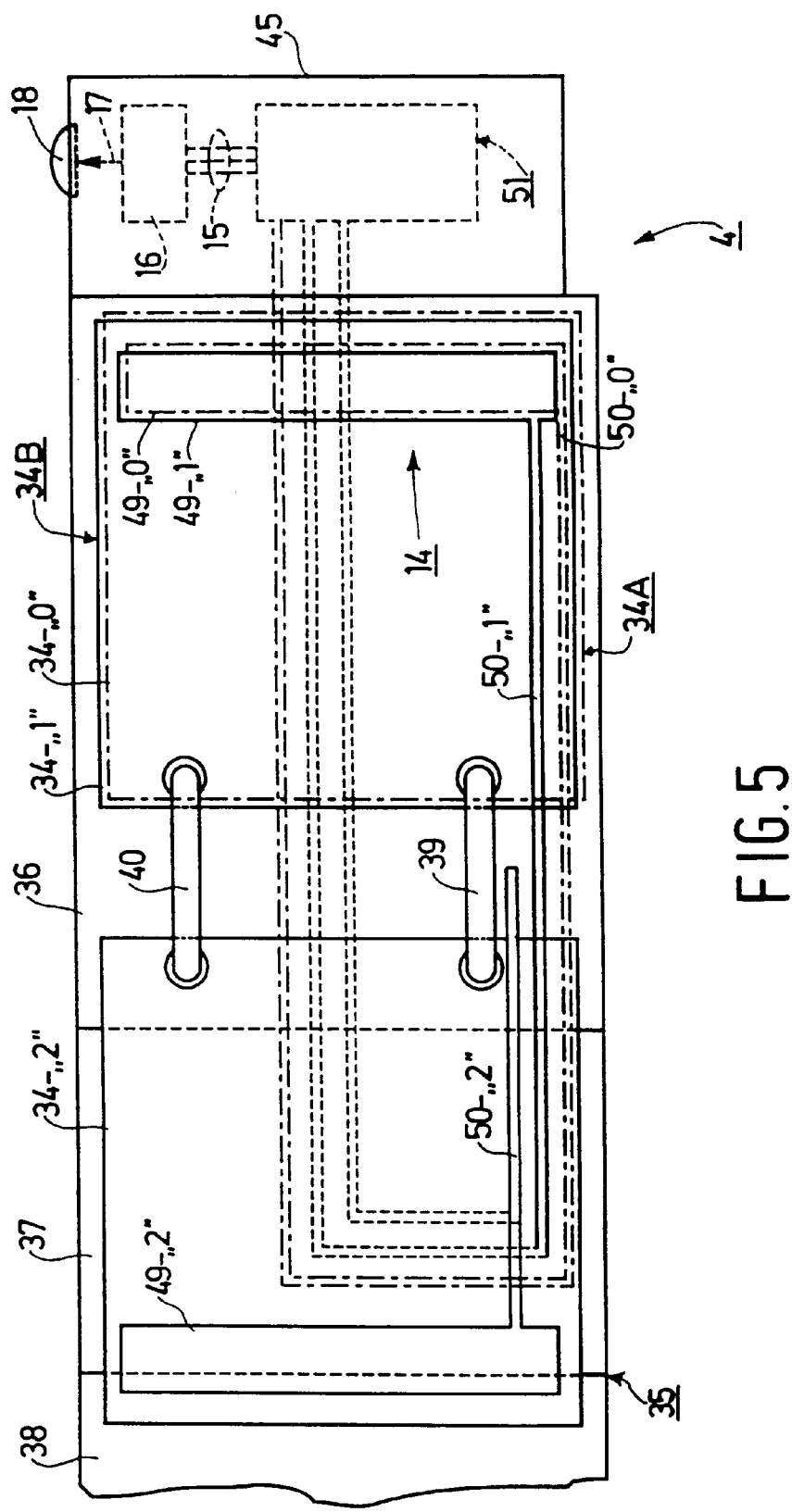
FIG. 5 shows diagrammatically the electrical construction of the remote control device shown in FIG. 4.

As is shown in FIG. 5 for the insert carriers 34-"0", 34-"1" and 34-"2" bearing the numerals "0", "1" and "2", each insert carrier 34 in the form of a sleeve is provided with an electrically conductive foil 49, which is for example glued to the relevant insert carrier 34. When the insert carriers 34 lie one on top of the other these foils 49 are also superposed and are insulated from one another by the insert carrier 34 of an electrically insulating material. In that case there is a capacitive coupling between the adjacent foils 49 of superposed insert carriers 34. In other words, this means that every two adjacent electrically conductive foils 49 form a capacitor. Each foil 49 is connected to an insert-carrier detection device 51 by an electrically conductive connection in the form of a flexible conductor 50, which insert-carrier detection device as well as the foils 49 and the flexible conductors 50 form part of the selection means 14 for generating the number "n" of a desired record-carrier holder 8-"n" and for selecting this holder 8-"n". The foils 49 and the flexible conductors 50 are numbered in the same way as the insert carriers 34 with the numbers "0", "1" to "n" and finally "N−1". In FIG. 5 the foil 49-"0" and the flexible conductor 50-"0" are shown in dash-dot lines for the clarity of the drawing.

Figure 6:
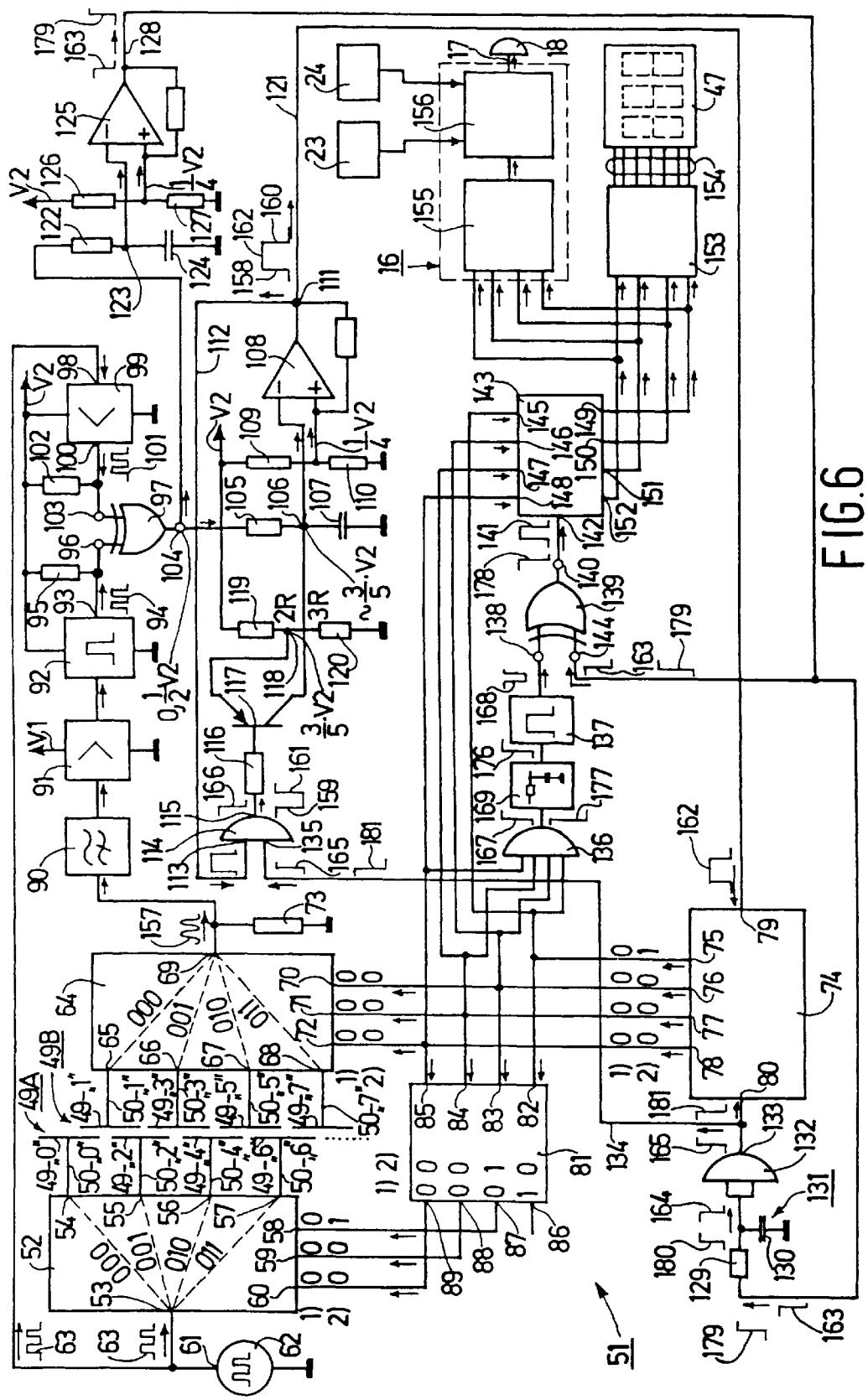
FIG. 6 shows the circuit diagram of an insert-carrier detection device of the remote control device shown in FIGS. 4 and 5.

The insert-carrier detection device 51 is shown in detail in FIG. 6. By means of the insert-carrier detection device 51 it is possible to detect for two adjacent insert carriers 34-"n" and 34-"n+1" which have been moved relative to one another and which bear the numbers "n" and "n+1" that insert carrier 34-"n" whose associated insert 25-"n" is visible as a result of the movement of the two insert carriers 34-"n" and 34-"n+1" relative to one another. In the present case it is possible by means of the insert-carrier detection device 51 to detect the number "n" of an insert carrier 34-"n" relative to which the adjacent insert carrier bearing the number "n+1", i.e. the insert carrier 34-"n+1" situated above it, has been moved. The detected number "n", which corresponds to the number "n" of a desired record-carrier holder 8-"n", can be transferred from the insert-carrier detection device 51 to the apparatus 3 of the system 1 shown in FIG. 1 in order to select the desired record-carrier holder 8, in that the detected number "n" is applied, via the electrical connection 15, to the means 16 for converting the detected number "n" into a form suitable for simple transmission to the apparatus 3 and the means 16 drive the infrared transmitter 18 via the electrical connection 17.

In the present case the insert-carrier detection device 51 is adapted to detect the presence of a certain capacitive coupling between two adjacent foils 49 of two adjacent insert carriers 34 and on the basis of the instantaneous detection result it determines the number "n" of a carrier 34-"n" relative to which the adjacent insert carrier 34-"n+1" has been moved. In the present case the insert-carrier detection device 51 is constructed very advantageously to detect the absence of a capacitive coupling between the foil 49-"n" of the insert carrier 34-"n" with the number "n" relative to which the adjacent insert carrier 34-"n+1" with the number "n+1" has been moved, and of the foil 49-"n+1" of the moved insert carrier 34-"n+1" with the number "n+1".

The insert-carrier detection device 51 will now be described in detail with reference to FIG. 6. The foils 49 numbered "1", "2", "3", "4", "5", "6" and "7" connected to the insert carriers 34 shown in FIG. 6 diagrammatically represent all the N foils 49. Similarly to the insert carriers 34 the foils 49 connected thereto also belong to a first group 49A of foils 49 and to a second group 49B of foils 49. The first group 49A of foils 49 includes the foils 49-"0", 49-"2", 49-"4" etc. The second group 49B of foils 49 includes the foils 49-"1", 49-"3", 49-"5" etc. The foils 49 bearing the numbers "0" to "7" are connected to the flexible conductors 50 bearing the same numbers "0" to "7".

The insert-carrier detection device 51 comprises a first multiplexer 52 having a first input 53 and a first output 54, a second output 55, a third output 56 and a fourth output 57, as well as a first control input 58, a second control input 59 and a third control input 60. The control inputs 58, 59 and 60 are can each receive a binary data word, the least significant bit (=LSB) being applied to the first control input 58 and the most significant bit (=MSB) to the third control input 60. The first multiplexer 52 is constructed in such a manner that in the case that a binary data word "000" is applied to its control inputs 58, 59 and 60 the input 53 is connected to the first output 54. When a binary data word "001" is applied to the control inputs 58, 59 and 60 the input 53 is connected to the second output 55. When a binary data word "010" is applied to the control inputs 58, 59 and 60 the input 53 is connected to the third output 55. When a binary data word "011" is applied to the control inputs 58, 59 and 60 the input 53 is connected to the fourth output 57.

An alternating voltage generator 62 has its output 61 connected to the input 53 of the first multiplexer 52 and is constructed as a squarewave generator which supplies a squarewave signal 63 having a frequency in the range between 20 kHz and 30 kHz to the input 53 of the first multiplexer 52.

The first output 54 of the first multiplexer 52 is connected to the foil 49-"0" via the flexible conductor 50-"0". The second output 55 of the first multiplexer 52 is connected to the foil 49-"2" via the flexible conductor 50-"2". The third output 56 of the first multiplexer 52 is connected to the foil 49-"4" via the flexible conductor 50-"4". The fourth output 57 of the first multiplexer 52 is connected to the foil 49-"6" via the flexible conductor 50-"6".

The insert-carrier detection device 51 further comprises a second multiplexer 64. The second multiplexer 64 has a first input 65, a second input 66, a third input 67, a fourth input 68 and an output 69. The second multiplexer 64 further has a first control input 70, a second control input 71 and a third control input 72. The control inputs 70, 71 and 72 are each arranged to receive a binary data word, the least significant bit (LSB) being applied to the first control input 70 and the most significant bit (MSB) to the third control input 72. When a binary data word "000" is applied to the control inputs 70, 71 and 72 the first input 65 is connected to the output 69. When a binary data word "001" is applied to the control inputs 70, 71 and 72 the second input 66 is connected to the output 69. When a binary data word "010" is applied to the control inputs 70, 71 and 72 the third input 67 is connected to the output 69. When a binary data word "011" is applied to the control inputs 70, 71 and 72 the fourth input 68 is connected to the output 69 of the second multiplexer 64.

The first input 65 of the second multiplexer 64 is connected to the foil 49-"1" via the flexible conductor 50-"1". The second input 66 of the second multiplexer 64 is connected to the foil 49-"3" via the flexible conductor 50-"3". The third input 67 of the second multiplexer 64 is connected to the foil 49-"5" via the flexible conductor 50-"5". The fourth input 68 of the second multiplexer 64 is connected to the foil 49-"7" via the flexible conductor 50-"7". A resistor 73 is connected to the output 69 of the second multiplexer 64. The resistor 73 and the capacitor formed by two capacitively coupled foils 49 form a high-pass filter, by means of which low-frequency interference signals, which may arise for example when the insert carrier 34 is touched by hand, can be suppressed or at least attenuated.

The insert-carrier detection device 51 comprises a counter 74 having a first output 75, a second output 76, a third output 77, a fourth output 78, an incrementing input 79 and a reset input 80. At its outputs 75, 76, 77 and 78 the counter 74 produces a binary data word corresponding to the instantaneous count, the least significant bit (LSB) appearing at the first output 75 and the most significant bit (MSB) of the instantaneous binary data word appearing at the fourth output 78.

The second output 76 of the counter 74 is connected to the first control input 70 of the second multiplexer 64. The third output 77 of the counter 74 is connected to the control input 71 of the second multiplexer 64. The fourth output 78 of the counter 74 is connected to the third control input 72 of the second multiplexer 64.

The insert-carrier detection device 51 further comprises an adder stage 81 having a first input 82, a second input 83, a third input 84, a fourth input 85, a first output 86, a second output 87, a third output 88, and a fourth output 89. The first output 75 of the counter 74 is connected to the first input 82 of the adder stage 81. The second output 76 of the counter 74 is connected to the second input 83 of the adder stage 81. The third output 77 of the counter 74 is connected to the third input 85 of the adder stage 81. The fourth output 78 of the counter 74 is connected to the fourth input 85 of the adder stage 81. The first output 86 of the adder stage 81 is free. The second output 87 of the adder stage 81 is connected to the first control input 58 of the first multiplexer 52. The third output 88 of the adder stage 81 is connected to the second control input 59 of the first multiplexer 52. The fourth output 89 of the adder stage 81 is connected to the third control input 60 of the first multiplexer 52.

The adder stage 81 is configured in such a manner that it each time adds the number one (1) to the binary data word applied to its inputs 82, 83, 84 and 85 and supplies the resulting binary data word to its outputs 86, 87, 88 and 89.

Moreover, a high-pass filter 90 for the rejection of low-frequency interference signals is connected to the output 69 of the second multiplexer 64. An amplifier 91, which is powered by a supply voltage V1, is connected to the high-pass filter 90. The amplifier 91 is followed by a pulse-shaper stage 92, which is powered by a supply voltage V2. The pulse-shaper stage 92 has an output 93 at which a squarewave signal 94 appears, which is applied to a load resistor 95 connected to the output 93. The output 93 of the pulse-shaper stage 92 is further connected to a correlator stage 97, which is simply formed by an EXCLUSIVE-OR gate, which is usually referred to briefly as an XOR gate, and which receives the squarewave signal 94.

The output 61 of the squarewave generator forming the alternating voltage generator 62 is further connected to an input 98 of an amplifier 99, so that the squarewave output signal 63 of the alternating voltage generator 62 is applied not only to the first multiplexer 52 via the input 53 of this multiplexer but also to the amplifier 99 via the input 98 of this amplifier. The amplifier 99 receives the same supply voltage V2 as the pulse-shaper stage 92. At an output 100 the amplifier 99 produces an amplified squarewave signal 101 across a load resistor 102 connected to the output 100. The output 100 of the amplifier 99 is connected to a second input 103 of the correlator stage 97, to which the squarewave signal 101 is applied. The correlator stage 97 together with the pulse-shaper stage 92, the amplifier 99 and the load resistors 95 and 102 forms a alternating voltage detector by means of which it is possible to detect whether an alternating voltage appears at the output 69 of the second multiplexer 64, which is the case only if there is a capacitive coupling between two adjacent foils 49 of two adjacent and superposed insert carriers 34.

In the correlator stage 97 the two squarewave signals 94 and 101 applied to the two inputs 96 and 103 of the correlator stage 97 are compared with one another by correlation. When the two squarewave signals 94 and 101 are correlated signals, i.e. when these two signals essentially correspond, this will produce at the output 104 of the correlator stage 97 a potential whose average value is substantially equal to ground potential. Conversely, if the two squarewave signals 94 and 101 applied to the inputs 96 and 103 of the correlator stage 97 are not correlated, this will produce at the output 104 of the correlator stage 97 a potential whose value is substantially equal to ½V2.

A resistor 105 has one terminal connected to the output of the correlator stage 97 and its other terminal to a circuit point 106 which in an initial state is held at a potential of approximately ⅗V2 in a manner to be described hereinafter. A capacitor 107 has one terminal connected to the circuit point 106 and its other terminal is at ground potential. The circuit point 106 is connected to an inverting input of a comparator 108. The non-inverting input of the comparator 108 is brought at a potential of approximately ¼V2 by means of a voltage divider comprising two resistors 109 and 110. The output of the comparator 108 is connected to a circuit point 111, which is connected to an input 113 of a NOR gate 114 via a line 112. The output 115 of the NOR gate 114 is connected to the base of a transistor 117 via a resistor 116, the emitter of this transistor being connected to the tap 118 of a voltage divider comprising two resistors 119 (2R) and 120 (3R), and the collector being connected to the circuit point 106.

The circuit point 111, which corresponds to the output of the comparator 108, is further connected to the incrementing input 79 of the counter 74 via a line 121.

The output 104 of the correlator stage 97 is further connected to a terminal of a resistor 122, whose other terminal is connected to a circuit point 123, to which a terminal of a capacitor 124 is connected, whose other terminal is at ground potential. The circuit point 123 is connected to the inverting input of a further comparator 125. The non-inverting input of the comparator 125 is brought at a reference potential of ¼V2 by means of a voltage divider which comprises two resistors 126 and 127 and which is connected to the supply voltage V2. The output of the comparator 125 is connected to a delay stage 131 via a line 128, which delay stage comprises a resistor 129 and a capacitor 130. The delay stage 131 is connected to an inverter 132 formed by a NOR gate, whose output 133 is connected to the reset input 80 of the counter 74 and, via a line 134, to the second input 135 of the NOR gate 114.

The insert-carrier detection device 51 further comprises a 4-fold NOR gate 136. The inputs of the 4-fold NOR gate 136 are connected to the outputs 75, 76, 77 and 78 of the counter 74. Only if the binary data word "0000" is applied from the outputs 75, 76, 77 and 78 of the counter 74 to the inputs of the 4-fold NOR gate 136 this NOR gate 136 will produce a control signal in the form of a rising edge 167 at its output, which is applied to a delay stage 169 comprising, for example, a resistor and a capacitor and having a delay time T1 of, for example, 0.25 s. After expiry of the delay time T1 of the delay stage 169 this stage supplies a delayed positive edge 176, which is applied to a pulse generator 137 connected to the delay stage 169 in order to activate the pulse generator 137. When the pulse generator 137 is activated it supplies a squarewave pulse to a first input 138 of a further XOR gate 139, which pulse produces a so-called latch pulse 141 at an output 140 of the XOR gate 139. The latch pulse 141 is applied to a latch input 142 of a latch 143, the falling edge of the latch pulse 141 starting a latching operation if the binary data word "0000" appears at the outputs 75, 76, 77 and 78 for a time longer than the delay time T1 of the delay stage 169, i.e. when no incrementing pulse 162 has been applied to the counter 74, which means that the insert carrier 34-"0" has been detected, which is then displayed on the display 47 by means of the latched binary data word "0000". The XOR gate 139 has a second input 144 connected to the output of the comparator 125 via the line 128.

The latch 143 has four inputs 145, 146, 147 and 148 and four outputs 149, 150, 151 and 152. The inputs 145, 146, 147 and 148 are connected to the outputs 75, 76, 77 and 78 of the counter 74. In this way a binary data word appearing at the outputs 75, 76, 77 and 78 of the counter 74 is applied to the inputs 145, 146, 147 and 148 of the latch 143 and when a latch pulse 141 is applied to the latch input 142 of the latch 143 it is latched, i.e. temporarily stored, in this latch 143 upon the appearance of the falling edge of the latch pulse 141. A binary data word stored in the latch 143 is available at the outputs 149, 150, 151 and 152 of the latch 143.

The outputs 149, 150, 151 and 152 of the latch 143 are connected to the inputs of a display driver 153, which decodes a binary data word received from the outputs 149, 150, 151, 152 of the latch 143 and in the present case representing the detected number "n" of an insert carrier 34-"n" and converts it into a form suitable for driving the 7-segment display device 47, to which display device 47 the decoded binary data word is applied via a multi-wire electrical connection 154.

The outputs 149, 150, 151 and 152 of the latch 143 are also connected to means 16 for converting the binary data word stored in the latch 143 and in the present case representing the detected number "n" of an insert carrier 34-"n". The means 16 include a converter 155, whose inputs are connected to the outputs 149, 150, 151 and 152 of the latch 143 and which converts the binary data word applied to its inputs in parallel form into a serial data word, which converter 155 is followed by a control stage 156 whose output signal is applied to the infrared transmitter 18 via the electrical connection 17.

The control stage 156 can be actuated by means of the first key 23 and the second key 24. When the control stage 156 is actuated by means of the first key 23 the binary data word converted in the converter 155 will be provided with additional information, which is processed in the apparatus 3 of the system 1 shown in FIG. 1 and in response to which the generated binary data word is utilized to bring the record-carrier holder 8 corresponding to this binary data word into its relative position corresponding to the slot 5 in the front wall 3a of the apparatus 3. When the control stage 156 is actuated by means of the second key 24 the binary data word converted in the converter 155 will be provided with additional information, in response to which in the apparatus 3 the record-carrier holder 8 corresponding to the converted binary data word is moved into its relative position corresponding to the playing device 9.

The operation of the insert-carrier detection device 51 of the remote control device 4 shown in FIGS. 1, 4 and 5 will now be described with reference to FIG. 6. It is assumed that the remote control device 4 is in the operating condition shown in FIG. 5, in which the flat insert carriers 34-"0" and 34-"1" are in their non-displaced rest positions, whereas all the other insert carriers 34, of which FIG. 5 only shows the insert carrier 34-"2", are in their displaced positions, as a result of which there is no capacitive coupling between the foil 49-"1" of the insert carrier 34-"1" and the foil 49-"2" of the insert carrier 34-"2".

As soon as the remote control device 4 shown in FIGS. 1, 4 and 5 is activated, which is possible for example by actuation of a key of the set of keys 48, the insert-carrier detection device 51 is also activated. This initiates a first step of the detection process for determining the number "n" of the insert carrier 34-"n" from which the adjacent insert carrier 34-"n+1" is moved away, i.e. lifted. During this first step after activation of the insert-carrier detection device 51 the count of the counter 74 will be zero (0). Consequently, the counter 74 will produce the binary data word "0000" at its outputs 75, 76, 77 and 78 during the first step of the detection process. As a result, the binary data word "0000" appears at the control inputs 70, 71 and 72 of the second multiplexer 64 during the first step, which results in the first input 65 of the second multiplexer 64 being connected to the output 69 of the second multiplexer 64.

In the first step of the detection process the binary data word "0000" appearing at the outputs 75, 76, 77 and 78 of the counter 74 is applied to the inputs 82, 83, 84 and 85 of the adder stage 81. The adder stage 81 adds the value one (1), as a result of which the binary data word "0001" appears at the outputs 86, 87, 88 and 89 of the adder stage 81. As a consequence, the binary data word "000" will appear at the control inputs 58, 59 and 60 of the first multiplexer 52 during the first step of the detection process. This results in the input 53 of the first multiplexer 52 being connected to the first output 54 of the first multiplexer 52.

The digital data word "0000" appearing at the outputs 75, 76, 77 and 78 of the counter 74 during the first step is also applied to the four inputs of the 4-fold NOR gate 136, which produces a rising edge 167 at its output when the binary word "0000" is applied to its inputs. The rising edge 167 is applied to the delay stage 169, which after its delay period T1 supplies a delayed rising edge 176 unless previously a falling edge has appeared at the input of the delay stage 169 and, consequently, at the output of the NOR gate 136, which inhibits the supply of the delayed rising edge 176 after the delay period T1, as is actually the case in the next detection process, as will be explained below.

As a result of the activation of the insert-carrier detection device 51 the squarewave generator forming the alternating voltage generator 62 is also activated and supplies the generated squarewave signal 63 at its output 61, which signal is applied both to the input 53 of the first multiplexer 52 and to the input 98 of the amplifier 99. The squarewave signal 63 is applied from the input 53 of the first multiplexer 52 to the first output 54 of the first multiplexer 52 and from this output to the foil 49-"0" via the flexible conductor 50-"0". Owing to the capacitive coupling a signal is transferred from this foil 49-"0" to the foil 49-"1", from the foil 49-"1" to the first input 65 of the second multiplexer 64 via the flexible conductor 50-"1", and from the first input 65 of the second multiplexer 64 to the output 69 of the second multiplexer 64. From the output 69 of the second multiplexer 64 an alternating signal 157, which corresponds to the squarewave signal 63 but which deviates from a squarewave shape as a result of its passage through the transmission path, is applied to the high-pass filter 90. The high-pass filter filters the alternating signal 157 and the filtered alternating signal is applied to the amplifier 91 and from the amplifier 91 to the pulse-shaper stage 92, at whose output 93 the shaped squarewave signal 94 appears. This squarewave signal 94 is applied to the first input 96 of the correlator stage 97. The squarewave signal 101 at the output 100 of the amplifier 99, which corresponds to the squarewave signal 63 supplied by the alternating voltage generator 62, is applied to the second input 103 of the correlator stage.

Owing to the capacitive coupling existing between the foil 49-"0" and the foil 49-"1" and the resulting transmission of the squarewave signal 63 and the consequently obtained alternating signal 157 and squarewave signal 94, the squarewave signal 94 is in correlation with the squarewave signal 101. This correlation between the two squarewave signals 94 and 101 is determined by means the correlator stage 97. This results in an average potential at the output 104 of the correlator stage 97, which substantially corresponds to ground potential. As a result, the potential at the circuit point 106, which is approximately ⅗V2 in the initial state, is pulled to ground potential in that the capacitor 107 is discharged. As soon as the decreasing potential at the circuit point 106 reaches the value of the reference potential of ¼V2 at the non-inverting input of the comparator 108, this comparator 108 supplies a rising edge 158 to its output and hence to the circuit point 111. The rising edge 158 is already obtained approximately 30 ms after activation of the insert-carrier detection device 51. The rising edge 158 is applied to the input 113 of the NOR gate 114 via the line 112. This gives rise to a falling edge 159 at the output 115 of the NOR gate 114, which edge turns on the transistor 117 via the resistor 116. As a result of this, the potential at the circuit point 118, which is adjusted to approximately ⅗V2 by means of the two resistors 119 and 120, is applied to the circuit point 106, which causes the capacitor 107 to be re-charged. As soon as the increasing potential at the circuit point 106 exceeds the reference potential of ¼V2 at the non-inverting input of the comparator 108 a falling edge 160 will appear at the output of the comparator 108 and, consequently, at the circuit point 111. The falling edge 160 already appears, for example, approximately 0.3 ms after the rising edge 158. The falling edge 160 is also applied to the input 113 of the NOR gate 114 via the line 112. This results in a rising edge 161 appearing at the output 115 of the NOR gate 114, which edge turns off the transistor 117 via the resistor 116, but in the meantime the circuit point 106 has already resumed at least substantially the initial potential of approximately ⅗V2.

The rising edge 158 and the falling edge 160 form a control pulse 162, which is applied to the incrementing input 79 of the counter 74 as an incrementing pulse. As a result, the count of the counter 74 is incremented, i.e. raised, by one (1).

The incrementation of the count of the counter 74 initiates a second step of the detection process for determining the number "n" of the insert carrier 34-"n" from which the adjacent insert carrier 34-"n+1" has been lifted. In the second step the counter 74 produces the binary data word "0001" at its outputs 75, 76, 77 and 78.

As a result, the binary data word "0001" is applied to the 4-fold NOR gate 136 and, consequently, the output of the 4-fold NOR gate 1346 is pulled to a low potential (Low) upon a falling edge 177 already after approximately 30 ms, i.e. before expiry of the delay time T1 of 0.25 s, so that the delay stage 169 does not produce a rising edge at its output to activate the pulse generator 137 and, as a consequence, no latch pulse is generated. Thus, the display 47 will not display the number "0" corresponding to the binary data word "0000".

Moreover, the binary data word "0001" now appearing at the outputs 75, 76, 77 and 78 of the counter 74 also ensures that the binary data word "000" also appears at the control inputs 70, 71 and 72 of the second multiplexer 64 during the second step. Thus, in the second step the first input 65 of the second multiplexer 64 remains connected to the output 69 of the second multiplexer 64.

The binary data word "0001" appearing at the outputs 75, 76, 77 and 78 of the counter 74 in the second step is applied to the inputs 82, 83, 84 and 85 of the adder stage 81, which adds the value one (1) to this binary data word, so that the digital data word "0010" appears at the outputs 86, 87, 88 and 89 of the adder stage 81. This causes the digital data word "001" to appear at the control inputs 58, 59 and 60 of the first multiplexer 52 during the second step. As a result, the input 53 of the first multiplexer 52 is now connected to the second output 55 of the first multiplexer 52.

The above-described connections in the first multiplexer 52 and the second multiplexer 64 now ensure that the squarewave signal 63 supplied by the alternating voltage generator 62 is applied to the second output 55 of the first multiplexer 52 via the input 53 of this first multiplexer 52 and from this second output to the foil 49-"2" via the flexible conductor 50-"2".

However, since the insert carrier 34-"2" has been moved away from, i.e. lifted off, the insert carrier 34-"1" there is no capacitive coupling between the two foils 49-"1" and 49-"2". As a result, the squarewave signal 63 applied to the foil 49-"2" is not transferred to the foil 49-"1". Thus, it is not possible to transfer a signal from the foil 49-"1" to the output 69 of the second multiplexer 64 via the flexible conductor 50-"1" and the first input 65 of the second multiplexer 64, so that the first input 96 of the correlator stage 97 receives no squarewave signal. However, the second input 103 of the correlator stage 97 does receive the squarewave signal 101. As a result of this, non-correlated signals appear at the two inputs 96 and 103 of the correlator stage 97, which is determined by means of this stage 97. The correlator stage 97 consequently produces an undefined alternating signal at its output 104, whose average value is substantially equal to the value ½V2.

The potential of ½V2 appearing at the output 104 of the correlator stage 97 causes the output potential of approximately ⅗V2 at the circuit point 106 to decrease to a value of ½V2 in that the capacitor 107 is discharged, but this has no effect at the output of the comparator stage 108 because the potential of ½V2 at the circuit point 106 is and remains higher than the reference potential of ¼V2 at the non-inverting input of the comparator 108. Thus, in this case no control pulse 162 is generated and, consequently, the counter 74 is not incremented. Therefore, the counter 74 retains the count corresponding to the binary data word "0001", at least for the time being.

When the output 104 of the correlator stage 97 remains at the above-mentioned potential of ½V2 for a given time interval longer than 30 ms, i.e. when in this time interval no correlation is found between the signals applied to the inputs 96 and 103, the capacitor 124 is charged via the resistor 122, upon which the potential at the circuit point 106 increases. As soon as the rising potential at the circuit point 123, which is connected to the inverting input of the further comparator 125, exceeds the reference potential of ¼V2 at the non-inverting input of the further comparator 125, this further comparator 125 produces a falling edge 163 at its output, which is applied to the second input 144 of the further XOR gate 139 via the line 128, resulting in a falling latch-edge 178 at the output 140 of the further XOR gate 139, which is applied to the latch input 142 of the latch 143. As a result of this, the binary data word "0001" supplied by the outputs 75, 76, 77 and 78 of the counter 74 in the second step and appearing at the inputs 145, 146, 147 and 148 of the latch 143 is stored temporarily in the latch 143.

The falling edge 163 at the output of the further comparator 125 is also applied to the delay stage 131 via the line 128, as a result of which a falling edge 164 is produced at the output of this stage and applied to the inverter 132, which consequently supplies a rising edge 165. The rising edge 165 is applied to the reset input 80 of the counter 74, so that the counter 74 is reset to zero (0) and inhibited, the presence of the delay stage 131 ensuring that this reset of the counter 74 is being effected until the previous count "0001" has been stored in the latch 143.

The rising edge 165 is further applied to the second input 135 of the NOR gate 114, which results in a rising edge 166 at the output 115, which turns on the transistor 117 via the resistor 116, causing the potential at the circuit point 106 to be restored to the initial value of approximately ⅗V2. In reality, the value of the potential at the circuit point 106 is equal to the potential of ⅗V2 at the circuit point 118 minus the base-emitter voltage of the transistor 117, but this is irrelevant in the present case.

The binary data word stored in the latch 143, which in the present case is formed by the binary data word "0001" and which represents the number "1" of the insert carrier 34-"1" stored by the user of the remote control device 4, is applied from the outputs 149, 150, 151 and 152 of the latch 143 to the inputs of the display driver 153, which in response thereto drives the display 47 in such a manner that this display 47 indicates the number "1".

From the outputs 149, 150, 151 and 152 of the latch 143 the data word "0001" corresponding to the number "1" is also applied to the inputs of the converter 155, which supplies a converted data word corresponding to this binary data word to the control stage 156, in which it is buffered.

If the user of the remote control device 4 actuates the first key 23 the buffered and converted data word is, for example, combined with additional information and is subsequently transmitted to the apparatus 3 of the system 1 of FIG. 1 via the infrared transmitter 18. In the apparatus 3 the received data is processed in such a manner that the record-carrier holder 8-"1", i.e. the record-carrier holder 8 bearing the number "1", is moved to its relative position corresponding to the slot 5 in the front wall 3a of the apparatus 3.

If the user of the remote control device 4 actuates the second key 24 the buffered converted data word is, for example, combined with other additional information and is subsequently transferred from the control stage 156 to the infrared transmitter 18 of the remote control device 4 to be transmitted to the apparatus 3 of the system 1 shown in FIG. 1. In the apparatus 3 the received data is processed in such a manner that the record-carrier holder 8-"1" is moved to the relative position corresponding to the playing device 9.

If the user of the system 1 in FIG. 1 has, for example, reached the sleeve forming the insert carrier 34-"6", i.e. has moved the insert carrier 34-"7" and all the further insert carriers 34 with higher numbers "8" to "N–1" away from the insert carrier 34-"6" by turning them over, the above-described first step of the detection process or detection cycle is repeated five more times in total, during which count of the counter 74 is also incremented five more times and after detection of the number "6" this number "6" is displayed on the display device 47. The preceding numbers "0" to "5" are not displayed. As soon as the number "6" appears on the display a user may regard this as an optical indication that he can transmit the detected number to the apparatus 3 of the system 1 by actuation of one of the keys 23 and 24.

After the number "n" of the instantaneously detected insert carrier 34 has been latched and displayed the counter 74 is always reset to zero and inhibited, so that the binary data word "0000" again appears at the outputs 75, 76, 77 and 78 of the counter 74. As a result, the binary data words "000" and "000" again appear at the control inputs 58, 59 and 60 of the first multiplexer 52 and the control inputs 70, 71 and 72 of the second multiplexer 64 and, consequently, the squarewave signal 63 supplied by the alternating voltage generator 62 is transferred from the foil 49-"0" to the foil 49-"1", so that again two correlated squarewave signals 94 and 101 appear at the first input 96 and the second input 103 of the correlator stage 97. Thus, a low potential, i.e. substantially ground potential, appears at the output 104 of the correlator stage 97. As a result, the previously charged capacitor 124 is discharged again. As soon as the potential at the circuit point 123 exceeds the reference value of ¼V2 at the non-inverting input of the further comparator 125 the output is switched to a high potential (High) upon a rising edge 179. The rising edge 179 is applied to the second input 144 of the XOR gate 139, but this does not affect the latching function of the latch 143. However, the rising edge 179 is also applied to the delay stage 131, which then supplies a delayed rising edge 180, which is applied to the inverter 132. The inverter 132 consequently supplies a falling edge 181, which enables the counting process of the counter 74 and which is also applied to the second input 135 of the NOR gate 114, so that the transistor 117 is turned off again. Now a new detection cycle can be started.

As is apparent from the above description, the system 1 in accordance with the invention shown in FIG. 1 enables a given record-carrier holder 8 in the apparatus 3 of the system 1 to be selected in a particularly simple manner, because for this selection it is merely required to leaf through the book-like catalog of insert carriers 34 in the remote control device 4. The insert carriers 34 are now formed by sleeves which each contain one insert 25 associated with a record carrier 2. With the aid of the visual information on each insert 25 it is very easy to find the desired insert 25 and hence the record carrier 2 associated with this insert 25. Once the desired insert 25 has been found, i.e. all the sleeves with their inserts 25 situated above the desired insert 25 have been turned over, the number, i.e. the code of the sleeve thus selected, is determined fully automatically by means of the insert-carrier detection device 5 and is transmitted to the apparatus 3 of the system 1 by actuation of a key. In the apparatus 3 the record-carrier holder 8 and the record carrier 2, if present therein, which correspond to the selected insert 25 and the sleeve containing the insert 25, is then moved to a relative position corresponding to a loading slot 5 of the apparatus 3 or a relative position corresponding to a playing device 9 of the apparatus 3.

It is to be noted that instead of being configured to hold only one insert the sleeve may also be adapted to hold, for example, two inserts, in which case each sleeve is associated with two record-carrier holders in the apparatus. After detection of the number of a selected sleeve it is then possible, by actuation of one of the two keys provided for this purpose on the remote control device, to automatically choose either the record-carrier holder associated with the one insert in the relevant sleeve or the record-carrier holder associated with the other insert in the relevant sleeve. Obviously, as a modification of the above embodiment, a sleeve may contain more than two, for example three or four inserts, in which case one sleeve is associated with three or four record-carrier holders in an apparatus. Accommodating more than one insert in a sleeve has the advantage that the number of superposed sleeves and hence the thickness of the remote control device can be reduced. In the exemplary embodiment described above the flat insert carriers 34 and the record-carrier holders 8 are coded with the numbers "0" to "N–1" but obviously it is also possible to assign the numbers "1" to "N" or to reverse the allocation of numbers to the insert carriers 34 in that the numbers "1" to "N" or "0" to "N–1" are assigned from the top to the bottom. The codes can be assigned to the insert carriers 34 in a manner which is transparent to the user, for example by marking the insert carriers 34 in accordance with the assigned code; however, if desired this marking may also be concealed, if the user need not necessarily know the relevant code.

Figure 7:
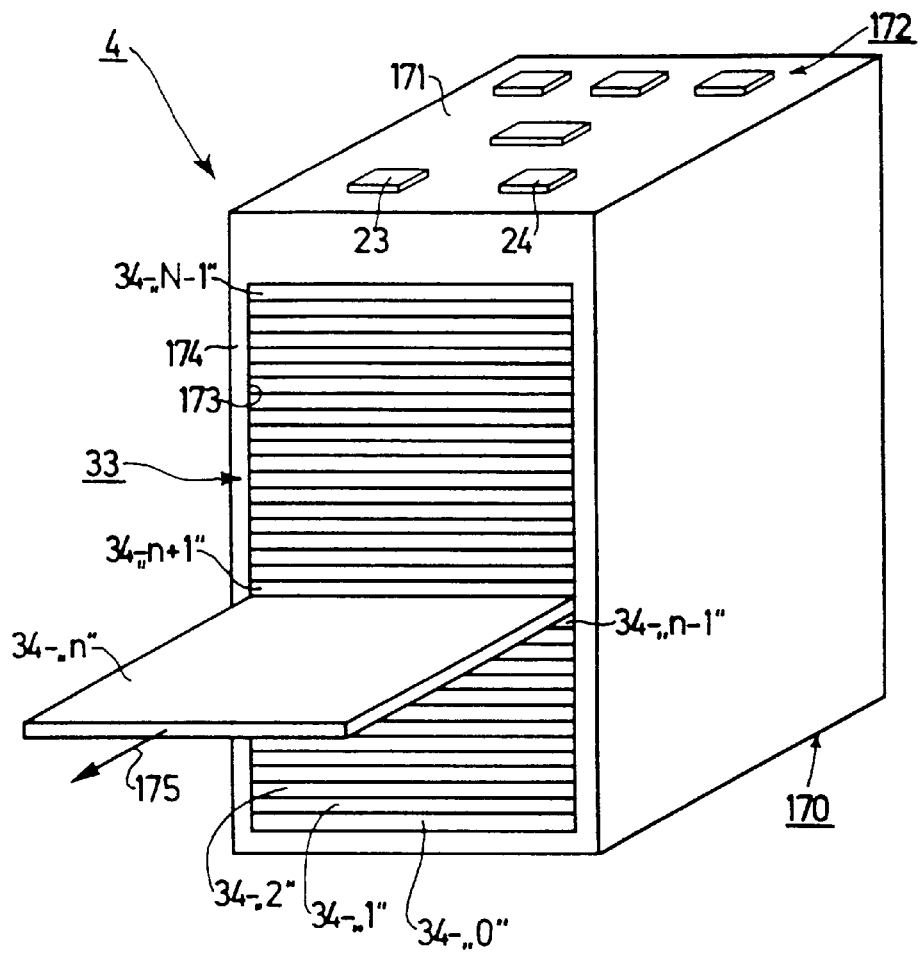
FIG. 7 shows very diagrammatically a second embodiment of a remote control device in accordance with the invention, which comprises stacked insert carriers for holding inserts associated with record carriers and which is intended for a second embodiment of a system in accordance with the invention.

FIG. 7 shows diagrammatically a remote control device 4 in a second embodiment. The remote control device 4 shown in FIG. 7 comprises an essentially rectangular housing 170 whose upper wall 171 carries a set of keys 172. The set of keys 172 also includes two keys 23 and 24 for starting the transmission of the number "n" of a detected insert carrier 34-"n" for an associated insert 25 from the remote control device 4 to an apparatus to be controlled by the latter.

The remote control device 4 shown in FIG. 7 also comprises a set 33 of flat insert carriers 34, to which successively different codes, i.e. different numbers, have been assigned. In the present case the insert carriers 34 also bear the numbers "0", "1", "2" to "n–1", "n", "n+1", and finally "N–1". In the present case the flat carriers 34 are formed by flat slipcovers, which can be withdrawn from or slid into the remote control device 4 at the location of an opening 173 in the front wall 174 of the remote control device 4. However, the slipcovers forming the flat insert carriers 34 cannot be wholly withdrawn from the remote control device 4 but only over a distance corresponding to approximately three quarters of their depth dimension, as can be seen in FIG. 8, which shows diagrammatically the insert carrier 34-"n" with the number "n" withdrawn from the remote control device 4 in the direction indicated by an arrow 175 and the insert carrier 34-"n–1" with the number "n–1" which remains in the remote control device 4.

Figure 8:
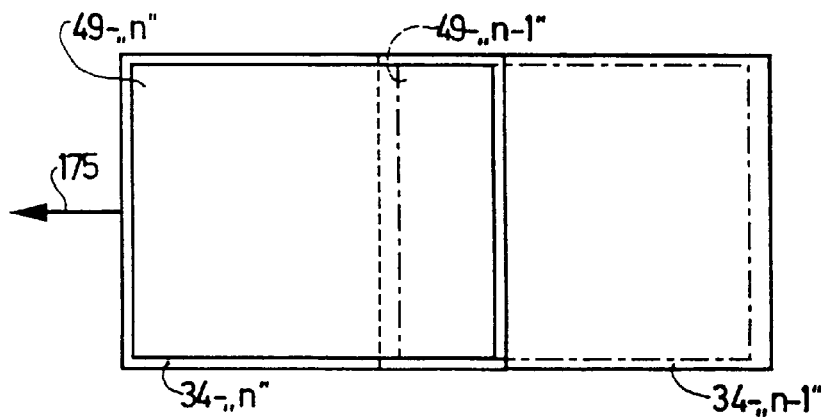
FIG. 8 shows diagrammatically two insert carriers of the remote control device shown in FIG. 7 one above the other, one insert carrier being displaced relative to the adjacent insert carrier.

In the remote control device 4 shown in FIG. 7 each slipcover forming a flat insert carrier 34 has been provided with a conductive foil 49 which extends over the entire area of the insert carrier 34, as is shown for the foils 49-"n" and 49-"n–1" in FIG. 8. There is a comparatively strong capacitive coupling between two foils 49 on two adjacent insert carriers 34 left in place in the remote control device 4, so that the capacitor formed by two such foils 49 has a comparatively high capacitance. Conversely, there is only a comparatively weak capacitive coupling between two foils 49 of two insert carriers 34, one of which is left in place in the remote control device 4 and the other of which has been withdrawn from the remote control device 4, so that the capacitor formed by two such foils 49 has only a comparatively low capacitance.

The remote control device 4 shown in FIG. 7 utilizes the fact that in this device 4 different capacitances occur between adjacent foils 49 depending on the position of two adjacent insert carriers 34 relative to one another, in that this remote control device 4 comprises as insert-carrier detection device a capacitance measuring device by means of which the instantaneous capacitance value of two adjacent foils can be measured. When this capacitance measuring device measures a small capacitance between two adjacent foils 49 the number of the relevant insert carrier 34 is derived from this.

The invention has been described in the foregoing on the basis of systems comprising apparatuses and remote control devices for use with disc-shaped record carriers which can be scanned optically. However, the invention can also be employed with systems for use with other record carriers, for example systems for use with magnetic-tape cassettes or systems for use with magnetically scanned disc-shaped record carriers or systems for use with card-shaped record carriers which each include an integrated solid-state memory. Moreover, the invention can be used with systems including apparatuses of another construction than in the exemplary embodiment described above. For example, such apparatuses for use with optically scanned disc-shaped record carriers may alternatively be constructed in such a manner that a multitude of record carriers are superposed in the apparatus like a stack, of which each disc-shaped record carrier can be inserted by hand into a slipcover-type disc holder.

As regards the construction of a control device in accordance with the invention there are further possibilities which deviate from the control devices in the exemplary embodiments described above. For example, a control device in the form of a remote control device may alternatively be constructed as a flip-over calendar, in which case a flat insert carrier in such a flip-over remote control device can be looked up in the same way as a given date on such a calendar. Moreover, a control device may be constructed in the same way as a card-index container, in which case the flat insert carriers for, for example, one insert are arranged upright adjacent one another in a container and each flat insert carrier can be pulled out of the container and each foil attached to a flat insert carrier is or can be connected to an insert-carrier detection device via a flexible foil, which detection device is situated, for example, in the container bottom. A control device may alternatively take the form of a book-like cover, which at the inner side of the cover bottom is connected to sleeves for holding inserts, in such a manner that the sleeves are slightly offset from one another in the height direction of the cover bottom and are each connected to the cover bottom at the location of lateral sides, which are also offset from one another in the height direction, as is known from the customary flip albums for photographs.

Moreover, it is to be noted that such a control device need not necessarily be implemented as a remote control device but may also be formed by a control device arranged directly on an apparatus. An insert-carrier detection device of a control device can also be constructed in an advantageous manner by means of a microcomputer. Furthermore, the transmission of a detected number from a remote control device to an apparatus can also be started fully automatically upon detection of this number, in which case at least one actuation key on the remote control device may be dispensed with. Alternatively, a remote control device may also be connected to an apparatus of a system in accordance with the invention via a connection cable.

FIG. 9 shows diagrammatically a system 1 comprising as presentation apparatus a menu-ordering device 176 and as remote control device a remote control device 4 of substantially the same construction as the remote control device 4 of the system 1 as shown in FIGS. 1 to 6.

With the menu-ordering device 176 it is possible to select and order one menu of a given number of different menus available in a restaurant or similar business and forming the selectable items. By means of the remote control device 4, whose insert-carriers 34 each contain an insert 25 on which, as shown diagrammatically in FIG. 9, the menu designation, a brief description of the menu and a picture of the menu are shown, it is possible to select as selectable item a menu in the menu-ordering device 176, in the same way as in the system 1 in accordance with FIGS. 1 to 6. For this purpose, the insert-carrier detection device 51 determines the number "n" of that insert carrier 34-"n" whose associated insert 25-"n" is visible and transfers this number "n" to the means 16 for converting the number into a form suitable for simple transmission to the menu-ordering device 176. As indicated by a dash-dot arrow 177 in FIG. 9, the infrared transmitter 18 transmits infrared signals to the infrared receiver 19 of the menu-ordering device 176. The signals received by the infrared receiver 19 of the menu-ordering device 176 are applied, via the electrical connection 21, to the means 21 for processing the received signals and re-converting them into a form representing the detected number "n". The means 21 supply control information corresponding to the received number to a control device 178 via the multi-wire electrical connection 22. In the present case the control device 178 supplies control information to a printer 180 via a multi-wire electrical connection 179. An order form 181 in accordance with the desired menu is printed out by the printer 180 and is output by the menu-ordering device 176. This order form 181 can also serve as a bill.

One of the above-mentioned remote control devices 4 may, for example, be provided on each table in a restaurant to select and control the menu-ordering device 176. The order form 181 issuing from the menu-ordering device 176 after selection by means of a remote control device 4 and marked with a table number by the printer is, for example, automatically transferred to a kitchen of the restaurant, after which the desired menu is prepared and served at the relevant table where the menu has been ordered, the order form 181 being at the same time put on this table as the bill.

FIG. 10 shows diagrammatically a further system 1 which comprises as presentation apparatus a telephone number output device 182, in which one telephone number of a given number of different telephone numbers forming selectable items can be selected and can subsequently be output. For this purpose, the telephone-number output device 182 comprises a solid-state memory 185 which can be controlled via a multi-wire electrical connection 184 and by which the desired telephone number selected with the aid of the remote control device 4, which is of the same construction as the remote control devices of the systems 1 as shown in FIGS. 1 to 6 and as shown in FIG. 9, is applied to a telephone number dialer 187 via a multi-wire electrical connection 186. The telephone number dialer 187 supplies a dialling signal representing the desired telephone number to an output 189 of the telephone-number output device 182 via a line 188, which signal is applied to the telephone network for automatically dialling the desired telephone number.

In the system shown in FIG. 10 each flat insert carrier 34 of the remote control device 4 contains an insert 25 showing, for example, the name of a telephone subscriber and a picture of the telephone subscriber, as is shown diagrammatically in FIG. 10. After the desired insert 25 has been found the system 1 as shown in FIG. 10 can automatically dial the telephone number of the telephone subscriber shown on this insert 25. However, automatic dialling is not necessary because a telephone-number output device may also be constructed in such a manner that it comprises a display device on which a telephone number forming the selected item is displayed, after which this telephone number can be dialled by hand.

It is to be noted that a system in accordance with the invention may also be constructed in such a manner that this system comprises a vending apparatus as presentation apparatus, in which one article of a given number of different articles to be sold and forming the selectable items can be selected, the system for selecting the articles to be sold comprising a remote control device whose construction basically corresponds to the construction of the remote control devices 4 of the systems 1 shown in FIGS. 1 to 6 and in FIGS. 9 and 10 and each insert carrier containing an insert showing an article to be sold and its price.

Figure 11:
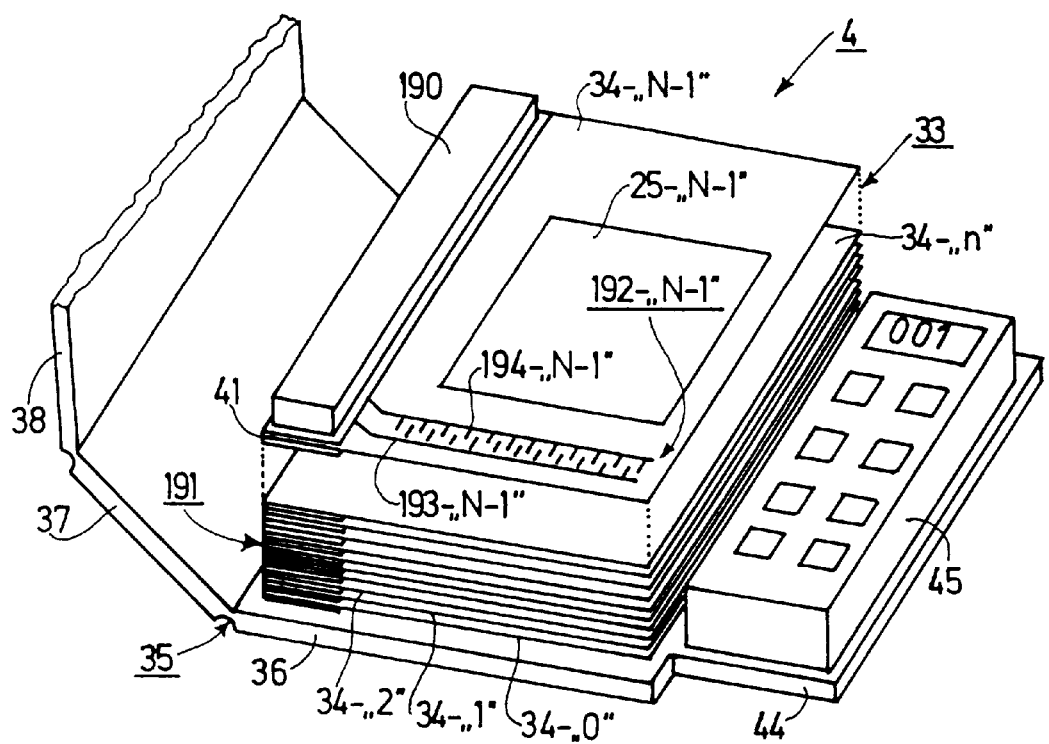
FIG. 11, similarly to FIG. 4, shows a remote control device in accordance with a third embodiment of the invention, which serves for controlling a presentation apparatus constructed as a changer and which comprises flat insert carriers which lie against one another as the pages of a book and which are intended to receive one insert each.

A further remote control device 4 will now be described with reference to FIGS. 11 to 13, which device is of a construction similar to that of the remote control device 4 shown in FIG. 4, i.e. such that the remote control device 4, as is shown in FIG. 11, comprises a set 33 of flat insert carriers 34 and for the well-ordered arrangement of the insert carriers 34 comprises a cover 35 resembling that of a book, which cover comprises a lower part 36, a back part 37 and an upper part 38.

In the present case, each flat insert carrier 34 is formed by a sleeve of a transparent and electrically insulating material. An insert 25 can be inserted into each sleeve and is visible because the sleeve is transparent. Each insert carrier 34 in the form of a sleeve has holes, not shown in FIGS. 11 and 12, in a margin area 41 facing the back part 37, which holes are traversed by internally screw-threaded sleeves, which project from a rigid bar 190 in the direction of the lower part 36 and into which fixing screws, not shown, have been fitted through the lower part 36. In this way, the insert carriers 34 are fixed between the lower part 36 and the bar 190. It is to be noted here, that in the margin areas 41 of the insert carriers 34 facing the back part 37 a zigzag contact arrangement 191, shown partly in FIG. 12, has been arranged, which will be described in detail hereinafter.

Moreover, it is to be noted that in the remote control device 4 shown in FIG. 11 the lower part 36 of the book-like cover 35 also comprises a lateral extension 44 which carries a housing 45 provided with a keyboard and accommodating the electrical circuitry of the remote control device 4. In another variant a distinctly flatter housing may accommodate only a keyboard, the electrical circuitry being arranged in a holder which directly adjoins the rear margin areas of the insert carriers.

Figure 12:
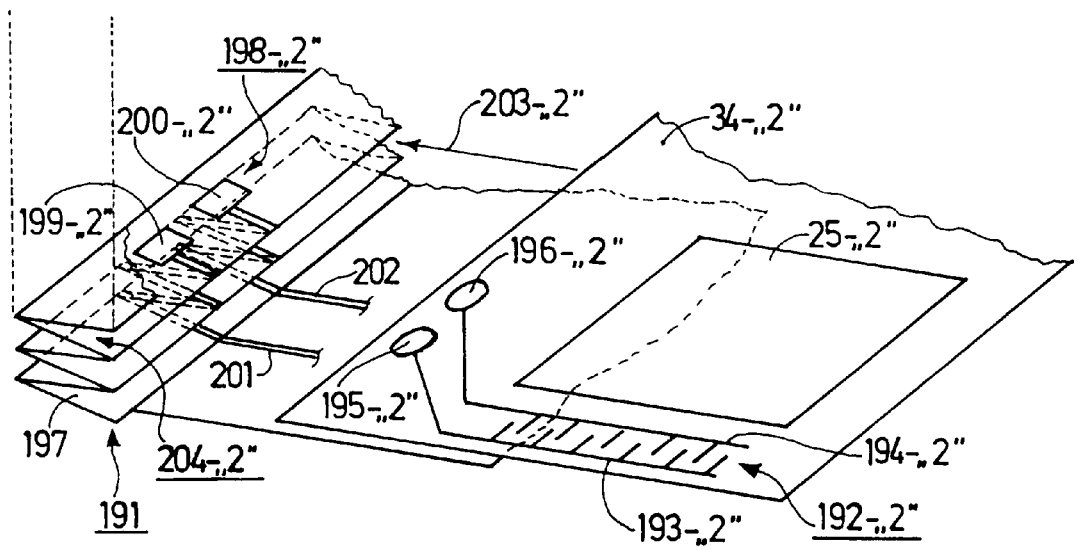
FIG. 12 shows a flat insert carrier used in the remote control device shown in FIG. 11, which insert carrier comprises two electrical connection eyelets and a zigzag contact arrangement of this remote control device.
Figure 13:
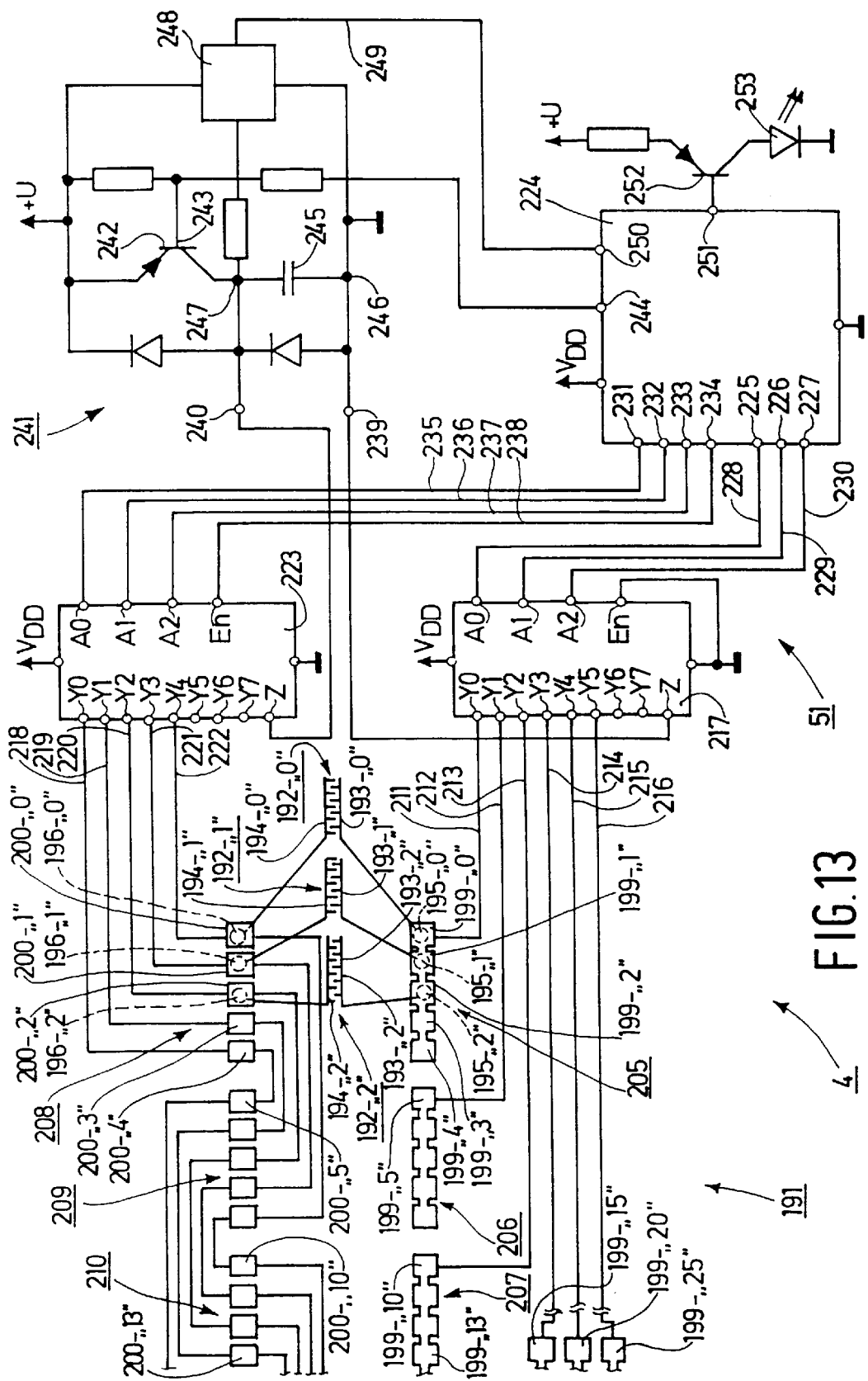
FIG. 13 shows the electrical construction of the relevant part of the contact arrangement shown in FIG. 12 and an insert-carrier detection device of the remote control device shown in FIG. 11.

The remote control device 4 shown in FIGS. 11 to 13, similarly to the remote control device 4 shown in FIGS. 4 to 6, serves to control a presentation apparatus formed by a changer into which a given number of N record carriers, i.e. CDs, can be loaded. For this purpose, such an apparatus comprises N record-carrier holders to each of which a numerical code has been assigned. It is assumed that the record-carrier holders bear the numerals "0", "1", "2", "3" to "n" and finally "N−1".

In accordance with the N record-carrier holders which can be selected as selectable items of the apparatus not shown in FIGS. 11 to 13, the set 33 of flat insert carriers 34 of the remote control device 4 shown in FIGS. 11 to 13 comprises a number N of insert carriers 34 proportional to the number N of record-carrier holders, each insert carrier 34 being associated with a record-carrier holder. In the present case the number N of insert carriers 34 corresponds to the number N of record-carrier holders. However, this is not necessary. For example, in the case of a number of N record-carrier holders in the apparatus to be controlled only N/2 insert carriers 34 may be provided, in which case each insert carrier 34 is adapted to hold two inserts 25 and comprises two adjacent tracks of an electrically conductive material. The numerical codes assigned to the insert carriers 34 of the remote control device 4 shown in FIGS. 11 to 13 are the same as those assigned to the record-carrier holders of the apparatus to be controlled, i.e. the numerals "0", "1" to "N−1", for which reason the insert carriers 34 in FIG. 11 bear the reference numerals 34-"0", 34-"1", 34-"2" to 34-"n" and finally 34-"N−1". The numerals need not be assigned to the record-carrier holders of the apparatus and to the insert carriers 34 of the remote control device 4 in the same sequence, an alternative assignment being also possible.

As is apparent from FIGS. 11 and 12, each insert carrier 34 in the remote control device 4 comprises a pair 192 of two adjacent tracks 193 and 194 of an electrically conductive material. The electrically conductive tracks 193 and 194 have intermeshing lateral track extensions directed towards the relevant other track. The adjacent tracks 193 and 194 have been arranged at such a distance from one another that the adjacent tracks 193 and 194 of a pair 192 on an insert carrier 34 relative to which the adjacent, i.e. the overlying, insert carrier 34 has been moved can be electrically interconnected by touching with at least one finger via the skin resistance of the at least one finger. The tracks 193 and 194 as well as the lateral track extensions are formed by, for example, a layer of an electrically conductive lacquer; however, alternatively they may be formed by a bonded copper foil, a deposited copper layer or a deposited layer of an electrically conductive synthetic material. The tracks 193 and 194 are each time situated on the upper side of an insert carrier 34. The tracks 193 have been connected to contact eyelets 195 and the tracks 194 to contact eyelets 196, which have been plated-through from the upper side of the insert carrier 34 to the underside of the insert carrier 34.

For the electrical connection of the tracks 193 and 194 to a insert-carrier detection device 51 shown in FIG. 13 the remote control device 4 comprises the afore-mentioned zigzag contact arrangement 191 shown partly in FIG. 12. The contact arrangement 191 basically consists of a carrier foil 197 folded in a zigzag shape. The carrier foil 197 carries pairs 198 of contact pads 199 and 200. The contact pads 199 and 200 are connected to the insert-carrier detection device 51 via electrically conductive connections 201 and 202. The contact pads 199 and 200 as well as the electrically conductive connections 201 and 202 are formed by, for example, a layer of an electrically conductive lacquer, but alternatively they may be formed by deposited copper layers or deposited layers of an electrically conductive synthetic material. It is emphasized that the arrangement of the contact pads 199 and 200 and electrically conductive connections 201 and 202 shown in FIG. 12 is merely diagrammatic. The actual electrical arrangement is shown in FIG. 13 and will be described in detail hereinafter with reference to this Figure.

As is apparent from FIG. 12, a insert carrier 34 should be inserted into a fold 204 of the zigzag contact arrangement 191 in a direction indicated by an arrow 203, in order to obtain electrical contact between the contact eyelets 195, 196 and the contact pads 199, 200 when the zigzag contact arrangement 191 is subsequently compressed by means of the bar 190, which can be secured to the bottom wall 36 by means of screws. Hereinafter, the electrical construction of the contact arrangement 191 and the insert-carrier detection device 51 of the remote control device 4 shown in FIGS. 11 to 13 will be described in detail with reference to FIG. 13.

For the time being, it is to be borne in mind that the remote control device 4 as shown in FIGS. 11 to 13 comprises thirty (30) insert carriers 34 in total, so that the number "N−1" is "29". However, a different number of insert carriers is also possible, for example sixty or one hundred insert carriers. The remote control device 4 comprises in total thirty contact eyelets 195, thirty contact eyelets 196, thirty contact pads 199 and thirty contact pads 200 in agreement with the thirty insert carriers 34.

As is apparent from FIG. 13, the thirty contact pads 199 and the thirty contact pads 200 in the remote control device 4 each comprise six (6) groups of five (5) contact pads each. Of these six groups FIG. 13 shows each time three groups bearing the reference numerals 205, 206, 207 and 208, 209, 210, respectively. The contact pads 199 of the individual groups 205, 206, 207 etc. are electrically interconnected. Each of these groups 205, 206, 207 etc. is connected to an input Y0, Y1, Y2, Y3, Y4 and Y5 of a first switching device 217 of the insert-carrier detection device 51 via a line 211, 212, 213, 214, 215 and 216. The contact pads 200 of the groups 208, 209, 210 etc. are interconnected in a meandering fashion, i.e. in such a manner that the contact pads 200-"0", 200-"9", 200-"10" etc., the contact pads 200-"1", 200-"8", 200-"11" etc., the contact pads 200-"2", 200-"7", 200-"12" etc. the contact pads 200-"3", 200-"6", 200-"13" etc. and the contact pads 200-"4", 200-"5", 200-"14" etc. are interconnected. Moreover, the contact pads 200-"4", 200-"3", 200-"2", 200-"1" and 200-"0" are each connected to an input Y0, Y1, Y2, Y3 and Y4 of a second switching device 223 of the insert-carrier detection device 51 via a line 218, 219, 220, 221 and 222. It is to be noted that in reality the electrical connection 201 shown diagrammatically in FIG. 12 is formed by the line 211. Likewise, the connection 202 is formed by the line 220.

The insert-carrier detection device 51 includes a microcomputer 224. Three control outputs 225, 226 and 227 of the microcomputer 224 are connected to three control inputs A0, A1 and A2 of the first switching device 217 via three lines 228, 229 and 230. A fourth control input En of the first switching device 217, referred to as the enable input, is connected to ground. Four further control outputs 231, 232, 233 and 234 of the microcomputer 224 are connected to four control inputs A0, A1, A2 and En of the second switching device 223 via four lines 235, 236, 237 and 238. The microcomputer 224 can be formed, for example, by the integrated device which is commercially available under the type designation TMP47C422. Each of the two controllable switching devices 217 and 223 can be formed, for example, by the integrated device which is commercially available under the type designation HEF4051B.

The microcomputer 224 is capable of producing such control information on its control outputs 225, 226, 227 as well as 231, 232, 234 that each time one of the inputs Y0, Y1, Y2, Y3, Y4 and Y5 of the first switching device 217 is connected to an output Z of the first switching device 217 and that each time one of the inputs Y0, Y1, Y2, Y3 and Y4 of the second switching device 223 is connected to an output Z of the second switching device 223. The supply of control information from the microcomputer 224 to the first switching device 217 and the second switching device 223 is effected in a cyclically repeated fashion in such a manner that in a detection cycle first of all the input Y0 of the first switching device 217 is connected to the output Z of the first switching device 217 and subsequently the inputs Y4, Y3, Y2, Y1 and Y0 of the second switching device 223 are successively connected to the output Z of the second switching device 223, that after this the input Y1 of the first switching device 217 is connected to the output Z of the first switching device 217 and subsequently again the inputs Y4, Y3, Y2, Y1 and Y0 of the second switching device 223 are successively connected to the output Z of the second switching device 223, that after this the input Y2 of the first switching device 217 is connected to the output Z of the first switching device 217 and subsequently again the inputs Y4, Y3, Y2, Y1 and Y0 of the second switching device 223 are successively connected to the output Z of the second switching device 223, and that finally this process is followed by connection of the inputs Y3, Y4 and Y5 of the first switching device 217 to the output Z of the first switching device 217 and subsequently the successive connection of the inputs Y4, Y3, Y2, Y1 and Y0 of the second switching device 223 to the output Z of the switching device 223, after which a subsequent detection cycle is started in that the input Y0 of the first switching device 217 is connected to the output Z of the first switching device 217 and subsequently the inputs Y4, Y3, Y2, Y1 and Y0 of the second switching device 223 are successively connected to the output Z of the second switching device 223.

As a result of the cyclically repeated switching by means of the first switching device 217 and the second switching device 223 as described above, all the pairs 192 of two adjacent tracks 193 and 194 can be connected in continually succeeding detection cycles to the two inputs 239 and 240 of a circuit 241 of the insert-carrier detection device 51 which are connected to the outputs Z of the two switching devices 217 and 223. Of each pair 192 the track 193 is then connected to the first input 239 of the circuit 241 via the first switching device 217 and the track 194 is connected to the second input 240 of the circuit 241 via the second switching device 223, so that the resistance present between the two tracks 193 and 194 of a pair 192 is connected to the two inputs 239 and 240.

In the present case the insert-carrier detection device 51 is adapted to detect the presence of a resistance between two adjacent tracks 193 and 194 of a pair 192 on an insert carrier 34 and, on the basis of the current detection result, it detects that insert carrier 34 of two insert carriers 34 which have been moved relative to one another, whose associated insert 25 is perceptible as a result of the movement of the two insert carriers relative to one another. To detect the presence of a resistance between two adjacent tracks 193 and 194 of a pair 192 on an insert carrier 34 the insert-carrier detection device 51 comprises the afore-mentioned circuit 241.

The circuit 241 includes a further controllable switching device 242, which in the present case is formed by a transistor having its base 243 connected to a further control input 244 of the microcomputer 224. Via the control output 244 the microcomputer 224 can set the controllable switching device 242 to its conductive state and to its non-conductive or off-state. A capacitor 245 arranged in series with the controllable switching device 242 has a first terminal connected to the first input 239 and a second terminal 247 to the second input 240 of the circuit 241. If the microcomputer 224 sets the controllable switching device 242 to its conductive state at an instant T1, the capacitor 245 is charged rapidly. If subsequently the microcomputer 224 sets the controllable switching device 242 to its off-state at an instant T2 and briefly before the instant T2 the microcomputer 224 controls the two switching devices 217 and 223 in such a manner that a pair 192 of adjacent tracks 193 and 194 are connected to the two inputs 239 and 240 of the circuit 241, the capacitor 245 can discharge in a discharge process via the resistance between the two tracks 193 and 194, which resistance is formed by the skin resistance of at least one finger in the case that the two tracks 193 and 194 of a pair are touched by at least one finger.

The terminals 246 and 247 of the capacitor 245 are connected to a voltage-level detector 248 by means of which it is possible to detect that a given discharge voltage is reached during the above-mentioned discharge process. The voltage-level detector 248 can be formed by an integrated device which is commercially available under the type designation HCU04. When the voltage-level detector 248 detects that a given discharge voltage is reached, the voltage-level detector 248 will apply detection information to an input 250 of the microcomputer 224 via a line 249 at an instant T3. The instant T3 occurs a time interval $\Delta T$ after the instant T2, which time interval $\Delta T$ in known manner depends on the value of the resistance via which the capacitor 245 is discharged.

Since the microcomputer 224 the turn-on and turn-off of the further switching device 242 via its control output 244, the instant T2 at which the further switching device 242 is turned off is also known in the microcomputer 224, which instant T2 is the instant at which the capacitor 245 begins to discharge. Via its input 250 the microcomputer 224 is also informed of the instant T3 at which a given discharge voltage is reached. By means of a simple time measurement the microcomputer 224 determines the time interval between the instant T2 at which the capacitor 245 begins to discharge and the instant T3 at which the given discharge voltage is reached, i.e. time interval $\Delta T$, with the aid of a time measuring stage realized by means of the microcomputer 224. From the time interval $\Delta T$ thus measured the microcomputer 224 determines the value and hence the presence of a resistance between two adjacent tracks 193 and 194 of a pair 192 on an insert carrier 34. On the basis of this detection result, i.e. the measured value of such a resistance, the microcomputer 224 determines that insert carrier 34 of two adjacent insert carriers 34 which have been moved relative to one another, whose associated insert 25 is visible as a result of the movement of the two insert carriers 34 relative to one another.

To detect the value of a resistance between two adjacent tracks 193 and 194 of a pair 192 on an insert carrier 34, the microcomputer 224 in the insert-carrier detection device 51 shown in FIG. 13 measures the value of a resistance between two adjacent tracks 193 and 194 in a first detection operation of a detection cycle as described above and, in addition, it again determines the value of a resistance between two adjacent tracks 193 and 194 in a second detection operation of a subsequent detection cycle and after this it determines the difference between the resistance values detected in the two detection operations and, on the basis of the difference thus determined, it detects that insert carrier 34 of two adjacent insert carriers 34 which have been moved relative to one another, whose associated insert 25 is perceptible as a result of the movement of the two insert carriers 34 relative to one another.

In operation of the remote control device 4 shown in FIGS. 11 to 13, as already stated, the pairs of two adjacent tracks 193 and 194 are connected to the inputs 239 and 240 of the circuit 241 in continuously succeeding detection cycles to determine the resistance between the two tracks 193 and 194 of each pair 192. Thus, in the present case thirty resistance values are determined in each detection cycle in conformity with the number of insert carriers 34. As long as a user of the remote control device 4 does not touch any of the pairs 192 of tracks 193 and 194 with a finger while leafing through and looking through the inserts 25 in the insert carriers 34, the insert-carrier detection device 51 will determine and store a very high resistance value, in theory even an infinitely high resistance value, under normal conditions. When the user of the remote control device 4 has subsequently found a desired insert 25 and has touched the tracks 193 and 194 provided on the insert carrier 34 carrying the desired insert with, for example, a finger, the resistance between these two tracks 193 and 194 will now be determined by the skin resistance of this finger. In practice, this skin resistance will have a value between approximately 100 k$\Omega$ and approximately 100 M$\Omega$. As soon as in next detection cycle the tracks 193 and 194 of a pair 192 interconnected by the finger of the user have been connected to the inputs 239 and 240 of the circuit 241 by means of the microcomputer 224 via the two switching devices 217 and 223 and the microcomputer 224, consequently, determines a resistance value which is reduced in comparison with the resistance value determined and stored in the preceding detection cycle, the microcomputer 224 detects which pair 192 of tracks 193 and 194 and, as consequence, which insert carrier 34 is involved because the microcomputer knows which pair 192 of tracks 193 and 194 it has just connected to the inputs 239 and 240 of the circuit 241. Subsequently, the microcomputer 224 stores the number "n" corresponding to the detected insert carrier 34. If, in the next detection cycle when the tracks 193 and 194 of the insert carrier 34 detected in the previous detection cycle are connected to the circuit 241, the microcomputer 224 again detects said previously determined reduced resistance value or a reduced resistance value which deviates only slightly from the previously determined reduced resistance value, the difference between the reduced resistance values determined in the successive detection cycles is smaller than a given selected threshold value and the previously stored number "n" of the detected insert carrier 34 is regarded as the final detection result and is stored on the microcomputer 224. Since this detection result is based on the determination of a difference between two resistance values, this detection result is, advantageously, independent of the absolute resistance values.

Subsequently, the microcomputer 224 generates control information in accordance with the stored number "n" of the detected insert carrier 34, which information is applied to a transistor 252 via an output 251 of the microcomputer 224, which transistor drives an infrared transmission diode 253 in accordance with the control information applied to it and thereby transmits information corresponding to the detected and stored number "n" of a detected insert carrier 34 to an apparatus constructed as a changer and controllable by the remote control device 4 shown in FIGS. 11 to 13. After this, the record-carrier holder corresponding to the detected number "n" of an insert carrier 34 is brought into a given operating position in this apparatus, after which the record carrier, i.e. the CD, accommodated in this record-carrier holder can, for example, be brought into a playing position in order to play the relevant CD.

Figure 14:
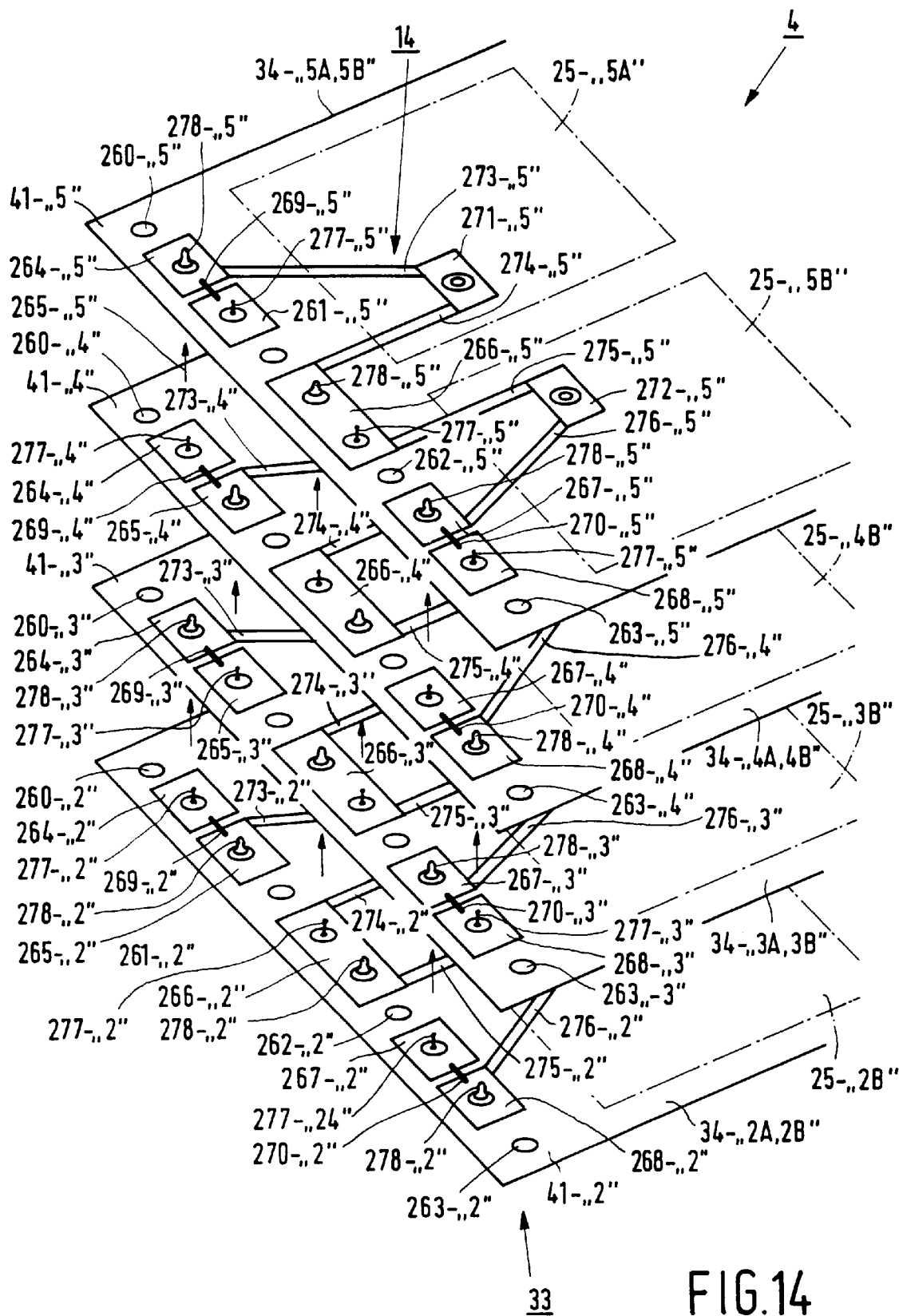
FIG. 14 schematically shows a part of a control device of a further system in accordance with the invention.
Figure 15:
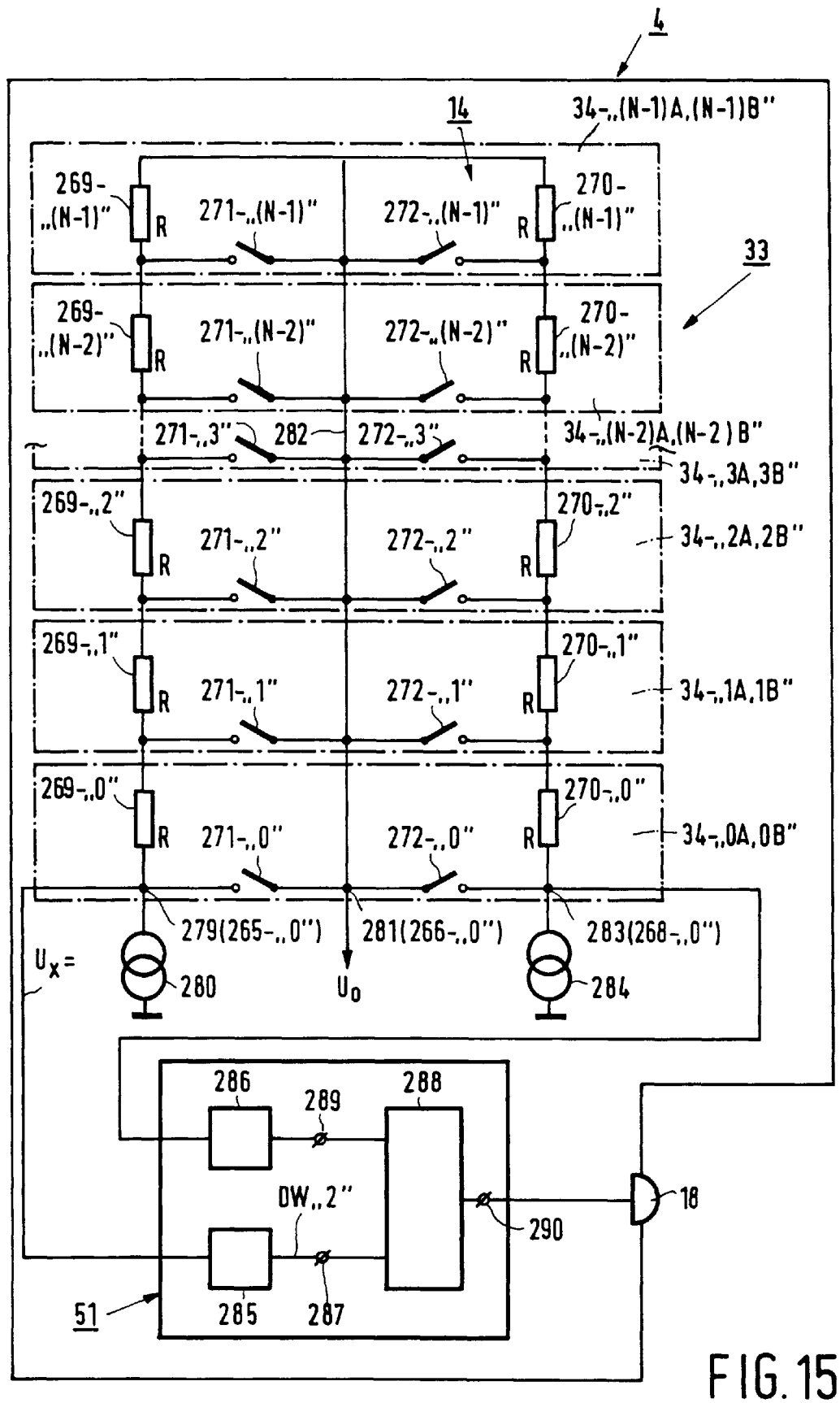
FIG. 15 schematically shows the control device shown in FIG. 14 comprising an infrared transmitter.

FIGS. 14 and 15 diagrammatically show a part of the control device of a further system in accordance with the invention, which also comprises an apparatus, not shown, for playing a plurality of record carriers. The control device is constructed as a remote control device 4 and comprises an infrared transmitter 18, shown diagrammatically in FIG. 15. In the present case the system, which is not shown separately, comprises an apparatus having a total of 2N record carrier holders, to be regarded as selectable items. To each of these 2N record-carrier holders a given code is assigned, in the present case formed by a combination of numerals and letters. The codes assigned to the 2N record-carrier holders are the combinations "0A", "0B", "1A", "1B", "2A", "2B", "3A", "3B", "4A", "4B" etc. to "(N–2)A", "(N–2)B", "(N–1)A" and "(N–1)B".

The remote control device 4 comprises selection means 14 for generating the code of a desired record-carrier holder and for selecting such a desired record-carrier holder. The selection means 14 will be described in more detail hereinafter.

In the same way as in the system 1 shown in FIGS. 1 to 6 and in the systems 1 shown in FIGS. 9, 10, and 11 to 13, the remote control device 4 comprises a set 33 of flat insert carriers 34, which set 33 of flat insert carriers 34 comprises a number N of carriers 34 proportional to the number 2N of record-carrier holders forming the selectable items, each time one carrier 34 and two record-carrier holders being associated with one another. In the present case each of the flat insert carriers 34 is again formed by a sleeve of a transparent and electrically insulating material. In FIG. 15 the insert carriers 34 are shown in dash-dot lines. Each insert carrier 34 has four holes 260, 261, 262 and 2633 in a left-hand margin area 41, through which holes connecting means, not shown, extend to hold the insert carriers 34 together in their margin areas 41.

The flat insert carriers 34 have the same codes as the record-carrier holders, i.e. there is an insert carrier 34-"0A, 0B", an insert carrier 34-"1A,1B", an insert carrier 34-"2A, 2B", etc. to, finally, an insert carrier 34-"(N–1)A,(N–1)B". In the present case each insert carrier 34, i.e. each transparent sleeve is adapted to receive two inserts 25, shown in dash-dot lines in FIG. 14, which are inserts are visible because the insert carriers 34 are transparent. The inserts 25 have the same codes as the insert carriers 34 and the record-carrier holders, so that there are inserts 25-"0A", 25-"0B", 25-"1A", 25-"1B", 25-"2A", 25-"2B", etc. to, finally, 25-"(N–1)A" and 25-"(N–1)B".

Each insert carrier 34 is movable relative to the adjacent insert carrier 34, which in this case corresponds to turning the pages of a book. For example, the insert carriers 34-"(N−1)A, (N−1)B", 34-"(N−2)A, (N−2)B" to 34-"3A,3B") can be moved by leafing through accordingly, which exposes the insert carrier 34-"2A,2B", as a result of which the inserts 25-"2A" and 25-"2B" in the insert carrier 34-"2A,2B" are visible. Subsequently, a user of the system and the remote control device 4 can decide to activate, for example, the record carrier which corresponds to the insert 25-"2A" and which is situated in the record-carrier holder having the code "2A". Therefore, the user selects the insert carrier 34-"2A, 2B" and the insert 25-"2A" situated in this insert carrier by means of the selection means 14 of the remote control device 4, after which the selection means 14 generate information corresponding to the code "2A", which information is transmitted from the remote control device 4 to the apparatus of the system by means of the infrared transmitter 18, in order to activate the record-carrier holder of the apparatus which holds the record carrier with the code "2A".

Each insert carrier of the remote control device 4 has five electrically conductive contact pads 264, 265, 266, 267 and 268 each formed by a deposited silver lacquer conductor pad. A resistor 269, in the present case a chip resistor, is interposed between each contact pad 264 and each contact pad 265. Likewise, a resistor 270, in the present case also a chip resistor, is interposed between each contact pad 267 and each contact pad 268. All the resistors 269 and 270 have the same resistance value R.

Each insert carrier 34 further comprises two switches 271 and 272, each formed by a so-termed diaphragm switch. The switches 271 are associated with the inserts 25-"0A", 25-"1A", 25-"2A", 25-"3A", 25-"4A" etc. and the switches 272 are associated with the switches 25-"0B", 25-"1B", 25-"2B", 25-"3B", 25-"4B" etc.

Of these switches 271 and 272 the switches 271-"0", 271-"2", 271-"4", 271-"6" etc. are arranged between the contact pads 265-"0" and 266-"0", 265-"2" and 266-"2", 265-"4" and 266-"4", and 265-"6" and 266-"6", respectively. The switches 271-"1", 271-"3", 271-"5", 271-"7" etc. are arranged between the contact pads 264-"1" and 266-"1", 264-"3" and 266-"3", 264-"5" and 266-"5", and 264-"7" and 266-"7", respectively. The switches 272-"0", 272-"2", 272-"4", 272-"6" etc. are arranged between the contact pads 266-"0" and 268-"0", 266-"2" and 268-"2", 266-"4" and 268-"4", and 266-"6" and 268-"6", respectively. The switches 272-"1", 272-"3", 272-"5", 272-"7" etc. are arranged between the contact pads 266-"1" and 267-"1", 266-"3" and 267-"3", 266-"5" and 267-"5", and 266-"7" and 267-"7", respectively. The electrical connections between the switches 271 and 272 and the contact pads 264, 265, 266, 267 and 268 are made by means of conductive connections formed by strip-shaped bonded copper foils or by deposited silver lacquer conductors.

The contact pads 266-"0", 266-"2", 266-"4", 266-"6" etc. and the contact pads 266-"0", 266-"2", 266-"4", 266-"6" etc. and the contact pads 267-"0", 267-"2", 267-"4", 267-"6" etc. as well as the contact pads 265-"1", 265-"3", 265-"5", 265-"7" etc. and the contact pads 266-"1", 266-"3", 266-"5", 266-"7" etc. and the contact pads 268-"1", 268-"3", 268-"5", 268-"7" etc. are connected to snap-type contact pins 277 via a solder joint each.

The contact pads 265-"0", 265-"2", 265-"4", 265-"6" etc. contact pads 266-"0", 266-"2", 266-"4", 266-"6" etc. and the contact pads 268-"0", 268-"2", 268-"4", 268-"6" etc. as well as the contact pads 264-"1", 264-"3", 264-"5", 264-"7" etc. and the contact pads 266-"1", 266-"3", 266-"5", 266-"7" etc. and the contact pads 267-"1", 267-"3", 267- "5", 267-"7" etc. are connected to snap-type contact sockets 278 via a solder joint each.

The contact pins 277-"0" are plugged into the contact sockets 278-"1" and thus form an electrical and a mechanical connection. Likewise, the contact pins 277-"1" are plugged into the contact sockets 278-"2" and the contact pins 277-"2" are plugged into contact sockets 278-"3" and the contact pins 277-"3" are plugged into contact sockets 278-"4". Finally, the contact pins 277-"(N−2)" are plugged into contact sockets 278-"(N−1)".

By means of the contact pads 264, 265, 266, 267 and 268, the conductive connections 273, 274, 275 and 276, the contact pins 277 and the contact sockets 278 the circuit arrangement shown in FIG. 15 is obtained for the resistors 269 and 270 and the switches 271 and 272. The Figure shows that when the switches 271 are not energized and are consequently open all the resistors 270 are arranged in series. The series arrangement of the resistors 269 has one end connected to a first terminal 279 of a first current source 280 and has its other end connected to a supply voltage $U_0$ by a common connection 282. The series arrangement of the resistors 270 has one end connected to a second terminal 283 of a second current source 284 and has its other end also connected to the supply voltage $U_0$ by the common connection 282. It is to be noted that the first terminal 279 corresponds to the contact pad 265-"0", the third terminal 281 corresponds to the contact pad 266-"0", and the second terminal 283 corresponds to the contact pad 268-"0" and that the two current sources 280 and 284 may be variable or adjustable. The insert-carrier detection device 51 of the remote control device 4 is connected to the first terminal 279 and the second terminal 283. The insert-carrier detection device 51 comprises a first analog-to-digital converter 285 connected to the first terminal 279 and a second analog-to-digital converter 286 connected to the second terminal 283. The first analog-to-digital converter 285 has its output connected to a first input 287 of a microcomputer 288. The second analog-to-digital converter 286 has its output connected to a second input 289 of the microcomputer 288. An output 290 of the microcomputer 288 is connected to the infrared transmitter 18.

In the situation already mentioned by way of example hereinbefore that, after having leafed through the insert carriers 34 and after having seen the information on the insert 25-"2A", a user has decided to activate the record carrier associated with the insert carrier 34-"2A, 2B" and the insert 25-"2A" contained in this insert carrier, the user will actuate the switch 271-"2" associated with the insert 25-"2A". In this way the resistors 269-"2", 269-"3" etc. to 269-"(N−1)" are short-circuited, which results in an active resistance of the value 2R determined by the two resistors 269-"0" and 269-"1". This yields a voltage $U_x$=U-"2" on the first terminal 279, whose voltage value U-"2" is determined by the resistance value 2R and thus forms an indication for the fact that the switch 271-"2" has been actuated, i.e. has been closed, and hence the insert carrier 34-"2A,2B" and the insert 25-"2A" therein and, consequently, the associated record carrier have been selected. The voltage $U_x$=U-"2" is detected by means of the first analog-to-digital converter 285, after which the first analog-to-digital converter 285 supplies a data word DW-"2" representing the voltage value U-"2" to the microcomputer 288. Subsequently, the microcomputer 288 supplies information INFO-"2A" representing the voltage value U-"2" to the infrared transmitter 18, which transmits this information INFO-"2A" to the apparatus of the system, after which the record carrier associated with the code "2A" is put into operation in this apparatus.

By actuating one of the switches 271 and 272, any record carrier in the apparatus of the system in accordance with the invention, whose remote control device 4 is shown in FIGS. 14 and 15, can be selected in a similar way.

It is to be noted that in the remote control device 4 for a system in accordance with the invention described with reference to FIGS. 14 and 15 it is particularly advantageous that it is not necessary to connect each insert carrier 34 to the insert-carrier detection device via separate electrical connections, but that only the insert carrier 34-"0A,0B" is connected to the insert-carrier detection device 51 via its contact pads 265-"0", 266-"0" and 268-"0", which correspond to the contact pads 279, 281 and 283, and that, moreover, all the insert carriers 34 are very simply connected to one another by means of the snap-type contact pins 277 and the snap-type contact sockets 278 and thus, eventually, to the insert-carrier detection device 51 partly via the resistors 269 and 270.

FIG. 16 shows diagrammatically a part of the control device of a further system in accordance with the invention, which also comprises an apparatus, not shown, for playing a plurality of record carriers. The control device takes the form of a remote control device 4. The present system, which is not shown separately, again comprises an apparatus having a total of 2N record-carrier holders which can be regarded as selectable items. Each of these 2N record-carrier holders has an associated code, in this case also a combination of numerals and letters. The codes associated with the 2N record-carrier holders are the combinations "0A", "0B", "1A", "1B" etc. to "(N−1)A" and "(N−1)N".

In the present case the remote control device 4 also includes selection means 14 for generating the code of a desired record-carrier holder and for selecting such a desired record-carrier holder. The selection means 14 will be described in more detail hereinafter.

The remote control device 4 also comprises a set 33 of flat insert carriers 34, which set 33 of flat insert carriers 34 comprises a number N of insert carriers 34 proportional to the number 2N of record-carrier holders, each time one carrier 34 and two record-carrier holders being associated with one another. The codes associated with the flat insert carriers 34 are the same as those assigned to the record-carrier holders, so that there is an insert carrier 34-"0A,0B", an insert carrier 34-"1A,1B" etc. to, finally, an insert carrier 34-"(N−1)A,(N−1)B". Each insert carrier 34, which is formed by a transparent sleeve, is adapted to receive two inserts, which are not shown in FIG. 16 and which are visible because the insert carrier is transparent. The inserts have the same codes as the insert carriers 34 and the record-carrier holders.

In the same way as in the remote control device 4 as shown in FIGS. 14 and 15, each insert carrier 34 in the remote control device 4 shown in FIG. 16 has in a margin area five electrically conductive contact pads 264, 265, 266, 267 and 268, each formed by a bonded copper foil or by a deposited silver lacquer conductor pad. The contact pads 264 and 267 are each disposed on the upper side of an insert carrier 34 and the contact pads 265 and 268 are each disposed on the underside of an insert carrier 34. The contact pads 266 each have a portion on the upper side and a portion on the underside of each insert carrier connected to one another.

A resistor 269, in the present case a chip resistor, is interposed between each contact pad 264 and each contact pad 265. Likewise, a resistor 270, in the present case also a chip resistor, is interposed between each contact pad 267 and each contact pad 268. In the remote control device 4 shown in FIG. 16 all the resistors 269 and 270 also have the same resistance value R.

Each insert carrier 34 of the remote control device 4, similarly to the remote control device 4 shown in FIGS. 14 and 15, comprises two switches 271 and 272, which are each formed by a so-termed diaphragm switch. Each of the two switches 271 and 272 is associated with an insert carrier, not shown. Each of the switches 271 is arranged on the underside of an insert carrier 34 between a contact pad 265 and a contact pad 266. Each of the switches 272 is arranged on the underside of an insert carrier 34 between a contact pad 266 and a contact pad 268.

The remote control device 4 shown in FIG. 6 comprises two terminal strips 291 and 292. The first terminal strip comprises three contact pads 293, 294 and 295, which in the present case arranged on the upper side of the first terminal strip 291. The second terminal strip 292 also comprises three contact pads 296, 297 and 298, which in the present case are arranged on the underside of the second terminal strip 292. All the contact pads 293, 294, 295, 296, 297 and 298 are formed by strip-shaped bonded copper foils or deposited silver lacquer conductors.

In the assembled condition of the remote control device 4 shown in FIG. 16 the contact pad 293 is electrically connected to the contact pad 265-"0", the contact pad 264-"0" to the contact pad 265-"1" and, finally, the contact pad 264-"(N−1)" to the contact pad 296. Furthermore, the contact pad 294 is electrically connected to the contact pad 266-"0", the last-mentioned contact pad to the contact pad 266-"1" and, finally, the contact pad 266-"(N−1)" to the contact pad 297. Moreover, the contact pad 295 is electrically connected to the contact pad 268-"0", the contact pad 267-"0" to the contact pad 268-"1" and, finally, the contact pad 267-"(N−1)" to the contact pad 298.

The contact pad 293 of the first terminal strip 291 is connected to a current source, not shown, via a conductor 299 and the contact pad 295 is connected to a second current source, not shown, via a further conductor 300. The contact pad 294 of the first terminal strip 291 is connected to a supply voltage $U_0$ via a further conductor 301. The two conductors 299 and 300 are further connected to an insert-carrier detection device, not shown in FIG. 16, in the same way as shown in FIG. 15 for the remote control device 4 in FIGS. 14 and 15. The contact pad 296 and the contact pad 297 of the second terminal strip 292 are electrically connected to one another via an electrical connection 302 and the contact pad 297 and the contact pad 298 of the second terminal strip 292 are electrically connected to one another via a further electrical connection 303.

In order to keep all the contact pads 264, 265, 266, 267, 268, 293, 294, 295, 296, 297 and 298 electrically connected to one another in the assembled condition of the remote control device 4, each insert carrier 34 in the remote control device 4 shown in FIG. 4 has three flat magnets 304, 305 and 306, the first terminal strip 291 also has three such magnets 307, 308 and 309, and the second terminal strip 292 likewise has three such magnets 310, 311 and 312. By means of the magnets 304, 305, 306, 307, 308, 309, 310, 311 and 312 mounted on the insert carriers 34 and the two terminal strips 291 and 292, the contact pads 264, 265, 266, 267, 268, 293, 294, 295, 296, 297 and 298 situated between them are held against one another. As a result, a satisfactory electrical connection between the contact pads 264, 265, 266, 267, 268, 293, 294, 295, 296, 297 and 298 is ensured in a simple manner. It is advantageous if the magnets 304, 305, 306, 307, 308, 309, 310, 311 and 312 have only a small thickness. In order to minimize the thickness it has proved to be advantageous if the magnets consist of neodymium-iron. However, it is obvious that it is also possible to use other magnet materials.

As regards the contact pads it is to be noted that instead of bonded copper foils or deposited silver lacquer conductors the contact pads may be formed by deposited carbon coatings. Moreover, it is to be noted that bonded copper foils provided as contact pads may also be gold-plated.

I claim:

1. A system comprising a presentation apparatus, in which a selectable item of a given number of different selectable items can be selected, and a control device for controlling the presentation apparatus, wherein the control device includes selection means for selecting the selectable items, characterized in that the control device comprises a set of insert carriers, wherein the set comprises a number of insert carriers proportional to the number of items selectable in the presentation apparatus, wherein the insert carriers lie against one another in a rest position and are configured to hold at least one insert associated with a selectable item and provided with perceptible information relating to the relevant selectable item, wherein the insert carriers are each movable relative to the adjacent insert carrier, and the control device includes an insert-carrier detection device configured to detect an insert carrier of two adjacent insert carriers have been moved relative to one another, whose associated insert is perceptible as a result of the movement of the two insert carriers relative to one another and by means of which the selectable item associated with the detected insert carrier is selectable.

2. A system as claimed in claim 1, adapted to hold a plurality of record carriers which are each combined with an associated insert provided with perceptible information relating to the contents stored on the associated record carrier, wherein the system comprises as presentation apparatus an apparatus into which a given number of record carriers can be loaded and which for holding the record carriers comprises a number of record-carrier holders corresponding to the number of record carriers, and which further comprises a control device adapted to control the apparatus and comprising selection means for selecting each of the record-carrier holders forming the selectable items, characterized in that the control device comprises a set of insert carriers which are proportional in number to the number of record-carrier holders provided in the apparatus and which lie against one another in a rest position, wherein the insert carriers are each associated with at least one record-carrier holder, which are configured to hold each at least one insert associated with a record carrier, and which are each movable relative to the adjacent insert carrier, and the control device includes an insert-carrier detection device configured to detect an insert carrier of two adjacent insert carriers which have been moved relative to one another, whose associated insert is perceptible as a result of the movement of the two insert carriers relative to one another and by means of which the record-carrier holder associated with the detected insert carrier is selectable.

3. A system as claimed in claim 1, characterized in that the presentation apparatus of the system is a menu-ordering device for selecting and ordering one menu of a given number of different menus available in a restaurant or similar business and forming the selectable items, and the system further comprises a control device adapted to control the menu-ordering device and including selection means for selecting each of the menus forming the selectable items, and the control device comprises a set of insert carriers which are proportional in number to the number of menus which can be selected and ordered in the menu-ordering device and which lie against one another in a rest position, wherein the insert carriers are each associated with at least one menu, which are configured to hold each at least one insert associated with a menu and provided with perceptible information relating to the associated menu, and which are each movable relative to the adjacent insert carrier, and the control device includes an insert-carrier detection device configured to detect an insert carrier of two adjacent insert carriers which have been moved relative to one another, whose associated insert is perceptible as a result of the movement of the two insert carriers relative to one another and by means of which the menu associated with the detected insert carrier is selectable.

4. A system as claimed in claim 1, characterized in that the presentation apparatus of the system is a telephone-number output device for selecting and outputting one telephone number of a given number of different telephone numbers forming the selectable items and stored in said telephone-number output device, and the system further comprises a control device adapted to control the telephone-number output device and including selection means for selecting each of the telephone numbers forming the selectable items, and the control device comprises a set of insert carriers which are proportional in number to the number of selectable and outputtable telephone numbers in the telephone-number output device, and which lie against one another in a rest position, wherein the insert carriers are each associated with at least one telephone number, which are configured to hold each at least one insert associated with a telephone number and provided with perceptible information relating to the associated telephone number, and which are each movable relative to the adjacent insert carrier, and the control device includes an insert-carrier detection device configured to detect an insert carrier of two adjacent insert carriers which have been moved relative to one another, whose associated insert is perceptible as a result of the movement of the two insert carriers relative to one another and by means of which the telephone number associated with the detected insert carrier is selectable.

5. A system as claimed in claim 1, characterized in that the insert carriers of the set of insert carriers are arranged to overly one another as the pages of a book and are accommodated in a cover resembling that of a book.

6. A system as claimed in claim 1, characterized in that the control device is a remote control device in which the set of insert carriers is integrated.

7. A system as claimed in claim 1, characterized in that each insert carrier of the set of insert carriers is formed by a sleeve of a transparent material, into which at least one insert can be introduced.

8. A system as claimed in claim 1, characterized in that each insert carrier comprises at least one pair of two adjacent tracks of an electrically conductive material, and two adjacent tracks of a pair on that insert carrier of two adjacent insert carriers which have been moved relative to one another, whose associated insert is perceptible as a result of the movement of the two insert carriers relative to one another, can be interconnected by touching with at least one finger via the skin resistance of the at least one finger, and each track is connectable to the insert-carrier detection device via an electrically conductive connection, and the insert-carrier detection device is adapted to detect the presence of a resistance between two adjacent tracks of a pair on an insert carrier and on the basis of the respective detection result detects an insert carrier of two adjacent insert carriers which have been moved relative to one another, whose associated insert is perceptible as a result of the movement of the two insert carriers relative to one another.

9. A system as claimed in claim 8, characterized in that the insert-carrier detection device is adapted to detect the value of a resistance between two adjacent tracks of a pair on an insert carrier in a first detection operation and, in addition, in a subsequent second detection operation and to determine the difference between the resistance values detected in the two detection operations and, on the basis of the difference thus determined, detects an insert carrier of two adjacent insert carriers which have been moved relative to one another, whose associated insert is perceptible as a result of the movement of the two insert carriers relative to one another.

10. A system as claimed in claim 8, characterized in that the insert-carrier detection device for detecting the presence of a resistance between two adjacent tracks of a pair on an insert carrier comprises a circuit including a capacitor which is chargeable via a controllable switching device, two adjacent tracks of a pair on an insert carrier each being connectable to one of the two terminals of said capacitor via a controllable switching device each in order to discharge the capacitor, wherein the terminals are connected to a voltage-level detector by means of which it is possible to detect that a given discharge voltage is reached, and there has been provided a microcomputer which cooperates with the controllable switching devices and the voltage-level detector to control the switching devices and to determine the time interval between the instant at which discharging of the capacitor begins and the instant at which the given discharge voltage across capacitor is reached, wherein the microcomputer detects from the time interval thus determined the presence of a resistance between two adjacent tracks of a pair on an insert carrier and, on the basis of this detection result, detects an insert carrier of two adjacent insert carriers which have been moved relative to one another, whose associated insert is perceptible as a result of the movement of the two insert carriers relative to one another.

11. A system as claimed in claim 1, characterized in that a code is assigned to each insert carrier, wherein the code corresponds to a code assigned to a selectable item.

12. A system as claimed in claim 11, characterized in that the code assigned to each insert carrier is a numeral.

13. A system as claimed in claim 11, characterized in that the insert-carrier detection device is adapted to detect the code of an insert carrier.

14. A system as claimed in claim 13, characterized in that the control device comprises a storage device for storing the code detected by means of the insert-carrier detection device.

15. A system as claimed in any claim 1, characterized in that each insert carrier has been provided with at least one electrically conductive foil, and when the insert carriers lie against one another the foils also lie against one another and are insulated from one another, the foils of insert carriers which lie against one another being capacitively coupled, and each foil can be connected to the insert-carrier detection device via an electrically conductive connection, and the insert-carrier detection device is adapted to detect the presence of a given capacitive coupling between two foils which lie against one another and on the basis of the respective detection result detects that insert carrier of two adjacent insert carriers which have been moved relative to one another, whose associated insert is perceptible as a result of the movement of the two insert carriers relative to one another.

16. A system as claimed in claim 15, characterized in that the insert-carrier detection device is adapted to detect the absence of a capacitive coupling between the foils of two adjacent insert carriers which have been moved relative to one another.

17. A system as claimed in claim 15, characterized in that the set of insert carriers comprises a first group of insert carriers and a second group of insert carriers, an insert carrier of one of the two groups of insert carriers being interposed between two insert carriers of the other one of the two groups of insert carriers, and the insert-carrier detection device comprises an alternating voltage generator having an output which can be connected time-sequentially to the foils of spatially succeeding insert carriers of one of the two groups of insert carriers, and an alternating voltage detector having an input which, in correspondence with the output of the alternating voltage generator, can be connected time-sequentially to the foils of spatially succeeding insert carriers of the other one of the two groups of insert carriers.

18. A system as claimed in claim 17, characterized in that the alternating voltage detector comprises a correlator stage having a first input and a second input, and the first input can be connected time-sequentially to the foils of spatially succeeding insert carriers of the other one of the two groups of insert carriers, and the second input is connected to the output of the alternating voltage generator, wherein the output can be connected time-sequentially to the foils of spatially succeeding insert carriers of one of the two groups of insert carriers.

19. A control device for a system comprising a presentation apparatus, in which one selectable item of a given number of different selectable items can be selected, wherein the control device includes selection means for selecting the selectable items, characterized in that the control device comprises a set of insert carriers, wherein the set comprises a number of insert carriers proportional to the number of items selectable in a presentation apparatus, wherein the insert carriers lie against one another in a rest position and are configured to hold at least one insert associated with a selectable item and provided with perceptible information relating to the relevant selectable item, wherein the insert carriers are each movable relative to the adjacent insert carrier, and the control device includes an insert-carrier detection device configured to detect an insert carrier of two adjacent insert carriers which have been moved relative to one another, whose associated insert is perceptible as a result of the movement of the two insert carriers relative to one another and by means of which the selectable item associated with the detected insert carrier is selectable.

20. A control device as claimed in claim 19 for a system adapted to hold a plurality of record carriers which are each combined with an associated insert provided with perceptible information relating to the contents stored on the associated record carrier, wherein the system comprises as presentation apparatus an apparatus into which a given number of record carriers can be loaded and which for holding the record carriers comprises a number of record-carrier holders corresponding to the number of record carriers, wherein the control device comprises selection means for selecting each of the record-carrier holders forming the selectable items, characterized in that the control device comprises a set of flat insert carriers which are proportional in number to the number of record-carrier holders provided in the apparatus and which lie against one another in a rest position, wherein the insert carriers are each associated with at least one record-carrier holder, which are configured to hold each at least one insert associated with a record carrier, and which are each movable relative to the adjacent insert carrier, and the control device includes an insert-carrier detection device configured to detect an insert carrier of two adjacent insert carriers which have been moved relative to one another, whose associated insert is perceptible as a result of the movement of the two insert carriers relative to one another and by means of which the record-carrier holder associated with the detected insert carrier is selectable.

21. A control device as claimed in claim 19, characterized in that the control device has been provided for a system which comprises a menu-ordering device as presentation apparatus, in which one menu of a given number of different menus available in a restaurant or similar business and forming the selectable items can be selected and ordered, and the control device includes selection means for selecting each of the menus forming the selectable items, and the control device comprises a set of flat insert carriers which are proportional in number to the number of menus which can be selected and ordered in the menu-ordering device and which lie against one another in a rest position, wherein the insert carriers are each associated with at least one menu, which are configured to hold each at least one insert associated with a menu and provided with perceptible information relating to the associated menu, and which are each movable relative to the adjacent insert carrier, and the control device includes an insert-carrier detection device configured to detect an insert carrier of two adjacent insert carriers which have been moved relative to one another, whose associated insert is perceptible as a result of the movement of the two insert carriers relative to one another and by means of which the menu associated with the detected insert carrier is selectable.

22. A control device as claimed in claim 19, characterized in that the control device has been provided for a system which comprises a telephone-number output device as presentation apparatus, in which one telephone number of a given number of different telephone numbers forming the selectable items and stored in said telephone-number output device are selectable and subsequently outputtable, and the control device includes selection means for selecting each of the telephone numbers forming the selectable items, and the control device comprises a set of flat insert carriers which are proportional in number to the number of selectable and outputtable telephone numbers in the telephone-number output device, and which lie against one another in a rest position, wherein the insert carriers are each associated with at least one telephone number, which are configured to hold each at least one insert associated with a telephone number and provided with perceptible information relating to the associated telephone number, and which are each movable relative to the adjacent insert carrier, and the control device includes an insert-carrier detection device configured to detect an insert carrier of two adjacent insert carriers which have been moved relative to one another, whose associated insert is perceptible as a result of the movement of the two insert carriers relative to one another and by means of which the telephone number associated with the detected insert carrier is selectable.

23. A control device as claimed in claim 19, characterized in that the flat insert carriers of the set of insert carriers are arranged to overly one another as the pages of a book and are accommodated in a cover resembling that of a book.

24. A control device as claimed in claim 19, characterized in that it is constructed as a remote control device in which the set of flat insert carriers is integrated.

25. A control device as claimed in claim 19, characterized in that each flat insert carrier of the set of insert carriers is formed by a sleeve of a transparent material, into which at least one insert can be introduced.

26. A control device as claimed in claim 19, characterized in that each insert carrier has been provided with at least one electrically conductive foil, and when the insert carriers lie against one another the foils also lie against one another and are insulated from one another, the foils of insert carriers which lie against one another being capacitively coupled, and each foil can be connected to the insert-carrier detection device via an electrically conductive connection, and the insert-carrier detection device is adapted to detect the presence of a given capacitive coupling between two foils which lie against one another and on the basis of the respective detection result detects an insert carrier of two adjacent insert carriers which have been moved relative to one another, whose associated insert is perceptible as a result of the movement of the two insert carriers relative to one another.

27. A control device as claimed in claim 26, characterized in that the insert-carrier detection device is adapted to detect the absence of a capacitive coupling between the foils of two adjacent insert carriers which have been moved relative to one another.

28. A control device as claimed in claim 26, characterized in that the set of insert carriers comprises a first group of insert carriers and a second group of insert carriers, an insert carrier of one of the two groups of insert carriers being interposed between two insert carriers of the other one of the two groups of insert carriers, and the insert-carrier detection device comprises an alternating voltage generator having an output which can be connected time-sequentially to the foils of spatially succeeding insert carriers of one of the two groups of insert carriers, and an alternating voltage detector having an input which, in correspondence with the output of the alternating voltage generator, can be connected time-sequentially to the foils of spatially succeeding insert carriers of the other one of the two groups of insert carriers.

29. A control device as claimed in claim 28, characterized in that the alternating voltage detector comprises a correlator stage having a first input and a second input, and the first input can be connected time-sequentially to the foils of spatially succeeding insert carriers of the other one of the two groups of insert carriers, and the second input is connected to the output of the alternating voltage generator, wherein the output can be connected time-sequentially to the foils of spatially succeeding insert carriers of one of the two groups of insert carriers.

30. A control device as claimed in claim 19, characterized in that each insert carrier comprises at least one pair of two adjacent tracks of an electrically conductive material, and two adjacent tracks of a pair on that insert carrier of two adjacent insert carriers which have been moved relative to one another, whose associated insert is perceptible as a result of the movement of the two insert carriers relative to one another, can be interconnected by touching with at least one finger via the skin resistance of the at least one finger, and each track is connectable to the insert-carrier detection device via an electrically conductive connection, and the insert-carrier detection device is adapted to detect the presence of a resistance between two adjacent tracks of a pair on an insert carrier and on the basis of the respective detection result detects an insert carrier of two adjacent insert carriers which have been moved relative to one another, whose associated insert is perceptible as a result of the movement of the two insert carriers relative to one another.

31. A control device as claimed in claim 30, characterized in that the insert-carrier detection device is adapted to detect the value of a resistance between two adjacent tracks of a pair on an insert carrier in a first detection operation and, in addition, in a subsequent second detection operation, and to determine the difference between the resistance values detected in the two detection operations and, on the basis of the difference thus determined, detects an insert carrier of two adjacent insert carriers which have been moved relative to one another, whose associated insert is perceptible as a result of the movement of the two insert carriers relative to one another.

32. A control device as claimed in claim 30 or 31, characterized in that the insert-carrier detection device for detecting the presence of a resistance between two adjacent tracks of a pair on an insert carrier comprises a circuit including a capacitor which is chargeable via a controllable switching device, two adjacent tracks of a pair on an insert carrier each being connectable to one of the two terminals of said capacitor via a controllable switching device each in order to discharge the capacitor, wherein the terminals are connected to a voltage-level detector by means of which it is possible to detect that a given discharge voltage is reached, and there has been provided a microcomputer which cooperates with the controllable switching devices and the voltage-level detector to control the switching devices and to determine the time interval between the instant at which discharging of the capacitor begins and the instant at which the given discharge voltage across capacitor is reached, wherein the microcomputer detects from the time interval thus determined the presence of a resistance between two adjacent tracks of a pair on an insert carrier and, on the basis of this detection result, detects that insert carrier of two adjacent insert carriers which have been moved relative to one another, whose associated insert is perceptible as a result of the movement of the two insert carriers relative to one another.

33. A control device as claimed claim 19, characterized in that a code is assigned to each insert carrier, wherein the code corresponds to a code assigned to a selectable item.

34. A control device as claimed in claim 33, characterized in that the code assigned to each insert carrier is a numeral.

35. A control device as claimed in claim 33, characterized in that the insert-carrier detection device is adapted to detect the code of an insert carrier relative to which the adjacent insert carrier.

36. A control device as claimed in claim 35, characterized in that it comprises a storage device for storing the code detected by means of the insert-carrier detection device.

* * * * *